United States Patent
Choi et al.

(10) Patent No.: US 8,259,644 B2
(45) Date of Patent: Sep. 4, 2012

(54) METHOD AND APPARATUS FOR TRANSMITTING AND RECEIVING DATA IN A COMMUNICATION SYSTEM ACCORDING TO A LOCATION OF A MOBILE STATION

(75) Inventors: Jin-Ghoo Choi, Seoul (KR); Sung-Yoon Jung, Seoul (KR); Sang-Boh Yun, Seongnam-si (KR); Kwang-Soon Kim, Seoul (KR); Young-Jin Sang, Seoul (KR); Jin-Bae Park, Incheon (KR); Seong-Lyun Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1164 days.

(21) Appl. No.: 12/098,168

(22) Filed: Apr. 4, 2008

(65) Prior Publication Data

US 2008/0247340 A1    Oct. 9, 2008

(30) Foreign Application Priority Data

Apr. 5, 2007    (KR) .................. 10-2007-0033913

(51) Int. Cl.
 *H04B 7/212*    (2006.01)
(52) U.S. Cl. .................. 370/321; 370/478; 455/7
(58) Field of Classification Search .................. None
See application file for complete search history.

(56) References Cited

U.S. PATENT DOCUMENTS

| | | | |
|---|---|---|---|
| 6,181,918 B1* | 1/2001 | Benveniste | 455/63.2 |
| 2005/0025093 A1* | 2/2005 | Yun et al. | 370/328 |
| 2006/0193280 A1* | 8/2006 | Lee et al. | 370/315 |
| 2007/0077934 A1* | 4/2007 | Chindapol et al. | 455/447 |

OTHER PUBLICATIONS

Pil Geun et al., "Unified radio Resource for Hybrid division Duplex system",Korea Information and Communications Society, Paper 06-31-11A-06, Nov. 2006.

* cited by examiner

*Primary Examiner* — Nittaya Juntima
*Assistant Examiner* — Khoa Huynh
(74) *Attorney, Agent, or Firm* — Jefferson IP Law, LLP

(57) ABSTRACT

A method and apparatus for transmitting and receiving data in a Base Station (BS) of a communication system are provided. A controller determines a location of a Mobile Station (MS), and determines a transmission/reception scheme for data transmission and reception to/from the MS according to the location of the MS. A transceiver transmits and receives data to/from the MS using the determined transmission/reception scheme. Preferably, the MS is located in any one of a cell's inner region and a cell's outer region, the cell's inner region has a radius which varies according to interference between adjacent cells, and the cell's outer region is a region defined by excepting the cell's inner region from the entire cell region.

14 Claims, 21 Drawing Sheets

METHOD AND APPARATUS FOR TRANSMITTING AND RECEIVING DATA IN A COMMUNICATION SYSTEM ACCORDING TO A LOCATION OF A MOBILE STATION

PRIORITY

This application claims the benefit under 35 U.S.C. §119 (a) of a Korean patent application filed in the Korean Intellectual Property Office on Apr. 5, 2007 and assigned Serial No. 2007-33913, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co. Ltd. and Industry-Academic Cooperation Foundation, Yonsei University.

BACKGROUND OF THE INVENTION

1. Field of the Invention

The present invention relates generally to a method and apparatus for transmitting and receiving data in a communication system. More particularly, the present invention relates to a method and apparatus for transmitting and receiving data using Relay Stations (RSs) in a Hybrid Division Duplex (HDD)-based communication system.

2. Description of the Related Art

FIG. 1 is a diagram illustrating data transmission and reception using RSs according to the conventional art.

Referring to FIG. 1, in an arbitrary cell 100, a Base Station (BS) 102 communicates with any of Mobile Station 1 (MS1) 108, MS2 110, MS3 112, MS4 114 and MS5 116 directly or via one of an RS1 104 and an RS2 106. The BS 102 and the RSs 104 and 106 use different subchannels.

The MS1 108 located in a boundary of the cell 100 and the MS5 116 located inside the cell 100 both communicate directly with the BS 102. That is, because the BS 102 is located a shorter distance from each of them as compared to the distance to either of RS1 104 or RS2 106, the MS1 108 and the MS5 117 communicate in synchronization with the BS 102 directly, without using an RS. In comparison, because of its distance from the BS 102 compared with its distance to an RS, the MS2 110 communicates with the BS 102 via its nearest RS1 104. Similarly, the MS3 112 and the MS4 114 also communicate with BS 102 via their nearest RS2 106.

Because of the different paths by which the MSs connect to the BS, the MSs have different synchronizations and an offset between the different synchronizations may occur. For example, a synchronization offset 135 occurs between first data 120 that the BS 102 has directly received from the MS1 108 and second data 130 that the BS 102 has received from the MS2 110 via the RS1 104. That is, in a period where the BS 102 performs Fast Fourier Transform (FFT) demodulation on the received first and second data 120 and 130, Cyclic Prefix (CP)-length phase shift occurs at arrival times of the data 120 and 130, causing Inter-Carrier Interference (ICI) 140.

In the foregoing conventional communication system, since the devices, such as BS and/or RS, to which an MS is connected, have different synchronizations, ICI interference may occur during received data demodulation at the BS, causing a decrease in the system performance.

SUMMARY OF THE INVENTION

An aspect of the present invention is to address at least the above-mentioned problems and/or disadvantages and to provide at least the advantages described below. Accordingly, an aspect of the present invention is to provide a method and apparatus for minimizing ICI interference by adaptively applying an HDD scheme according to the location of a Mobile Station (MS).

Another aspect of the present invention is to use different frequency reuse factors in a cell's inner region and a cell's outer region, and provide an adaptive HDD method between a Base Station (BS) and a Relay Station (RS) according to the location of an MS.

According to one aspect of the present invention, a method for transmitting and receiving data by a Base Station (BS) in a communication system is provided. The method includes determining a location of a Mobile Station (MS), determining a transmission/reception scheme for data transmission and reception to/from the MS according to the location of the MS and transmitting and receiving data to/from the MS using the determined transmission/reception scheme. In one implementation, the MS is located in any one of a cell's inner region and a cell's outer region, the cell's inner region having a radius which is flexible according to interference between adjacent cells, and the cell's outer region being a region defined by excepting the cell's inner region from the entire cell region.

According to another aspect of the present invention, an apparatus for transmitting and receiving data in a Base Station (BS) of a communication system is provided. The apparatus includes a controller for determining a location of a Mobile Station (MS) and for determining a transmission/reception scheme for data transmission and reception to/from the MS according to the location of the MS and a transceiver for transmitting and receiving data to/from the MS using the determined transmission/reception scheme. In one implementation, the MS is located in any one of a cell's inner region and a cell's outer region, the cell's inner region having a radius which is flexible according to interference between adjacent cells, and the cell's outer region being a region defined by excepting the cell's inner region from the entire cell region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms used herein are defined based on functions in the present invention and may vary according to users, operators' intention or usual practices. Therefore, the definition of the terms should be made based on contents throughout the specification.

A Hybrid Division Duplex (HDD) scheme uses both a Time Division Duplex (TDD) scheme suitable for a micro cell, and a Frequency Division Duplex (FDD) scheme suitable for a fast MS and a macro cell. That is, the HDD scheme is suitable for a system having an asymmetric ratio and a high data rate.

Figure 1:
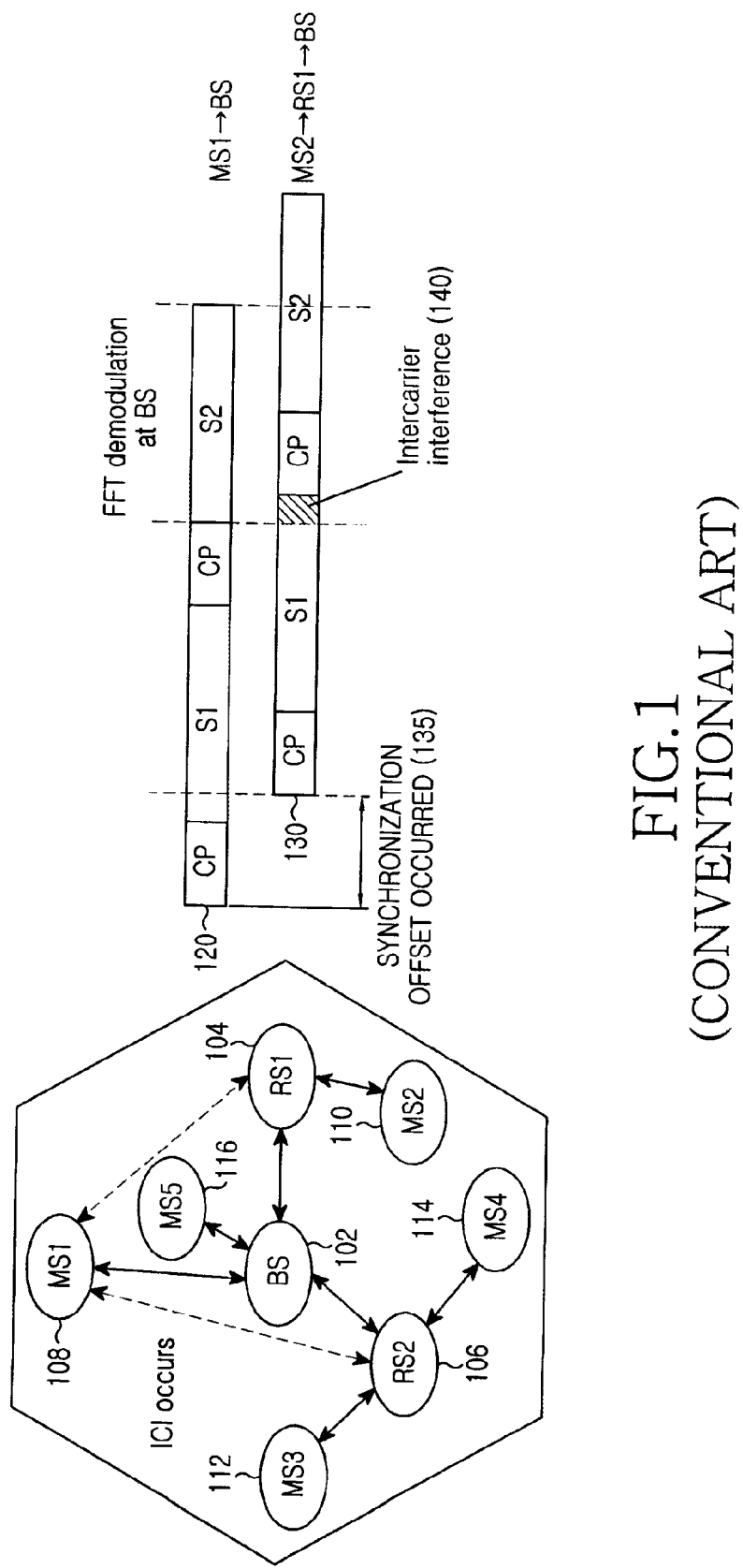
FIG. 1 is a diagram illustrating data transmission and reception using RSs according to the conventional art.
Figure 2:
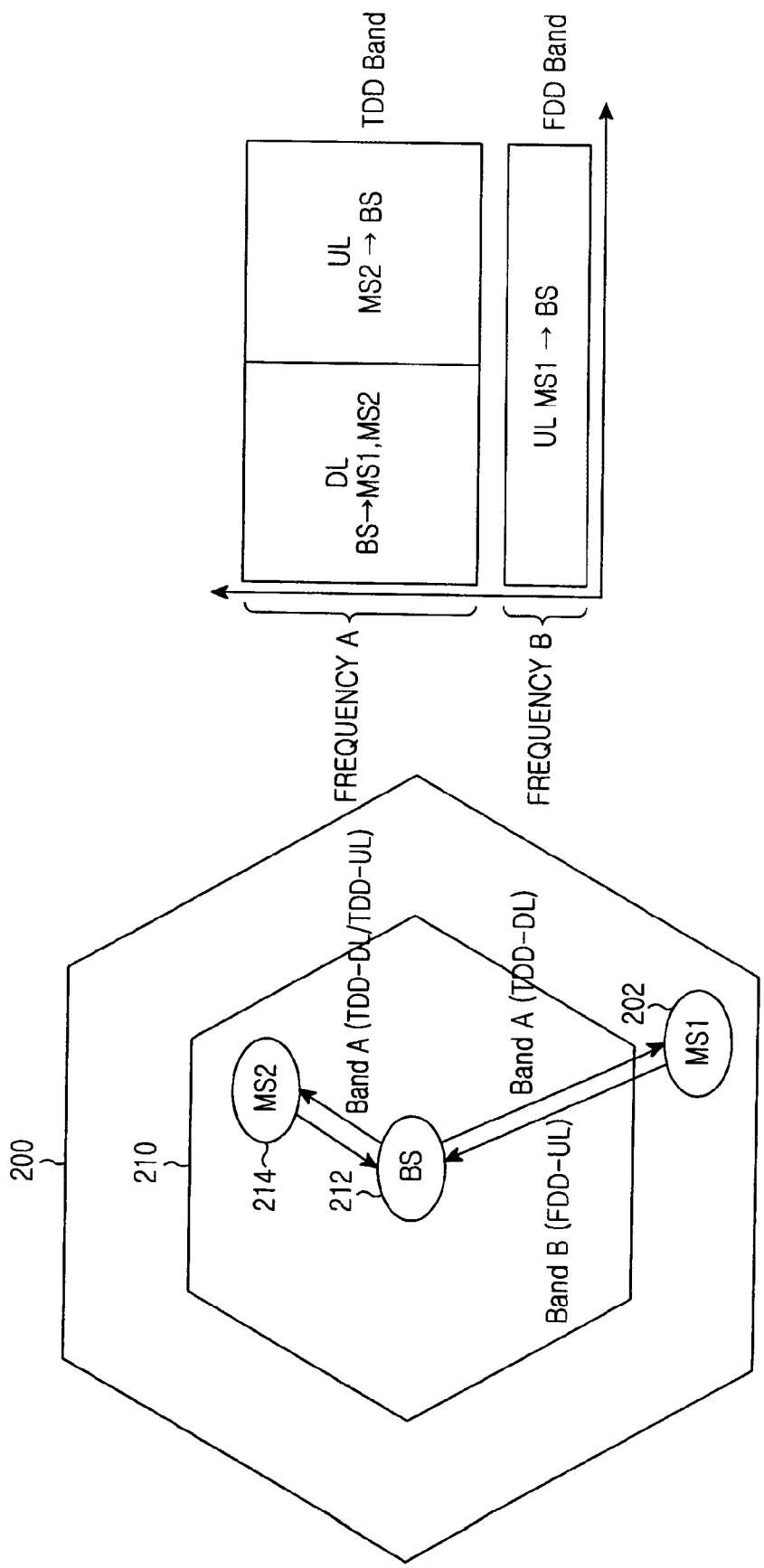
FIG. 2 is a diagram illustrating an HDD-based communication system according to an exemplary embodiment of the present invention.

FIG. 2 is a diagram illustrating a HDD-based communication system according to an exemplary embodiment of the present invention.

Referring to FIG. 2, a cell is divided into an inner region 210, which is a shorter distance from a BS 212 and an outer region 200, which is a longer distance from the BS 212. With application of the FDD scheme, the BS 212 separates a frequency band with which it communicates with an MS2 214 located in the inner region 210 from a frequency band with which it communicates with an MS1 202 located in the outer region 200.

That is, by applying the TDD scheme to a single frequency band A, the MS2 214 located in the inner region 210 communicates with the BS 212 using an Up Link (UL) interval and a Down Link (DL) interval on a separate basis. The MS1 202 located in the outer region 200 uses a frequency band B to which the FDD scheme is applied, in the UL interval, and uses the frequency band A to which the TDD scheme is applied, in the DL interval.

As described above, the HDD scheme can have the merits of both the TDD scheme and the FDD scheme. In addition, the HDD scheme can overcome inter-Cross Time Slot (CTS) interference which may occur due to the UL/DL asymmetry between cells by means of the TDD scheme. However, in the UL interval where the frequency band B is used, there is interference from an adjacent cell.

With use of two different frequency bands, exemplary embodiments of the present invention use different duplex schemes, i.e., TDD scheme and FDD scheme, for communication between each pair of a Base Station (BS), a Relay Station (RS) and a Mobile Station (MS). Each duplex scheme efficiently controls interference between adjacent cells using different frequency reuse factors, and separates ICI which may occur due to a signal generated in an outer region, from that of an inner region, by separating transmission/reception bands between the inner region and the outer region. In addition, exemplary embodiments of the present invention can efficiently manage the interference between adjacent cells by allocating different frequency reuse factors in the cell's outer region and the cell's inner region on a fixed or adaptive basis.

Figure 3:
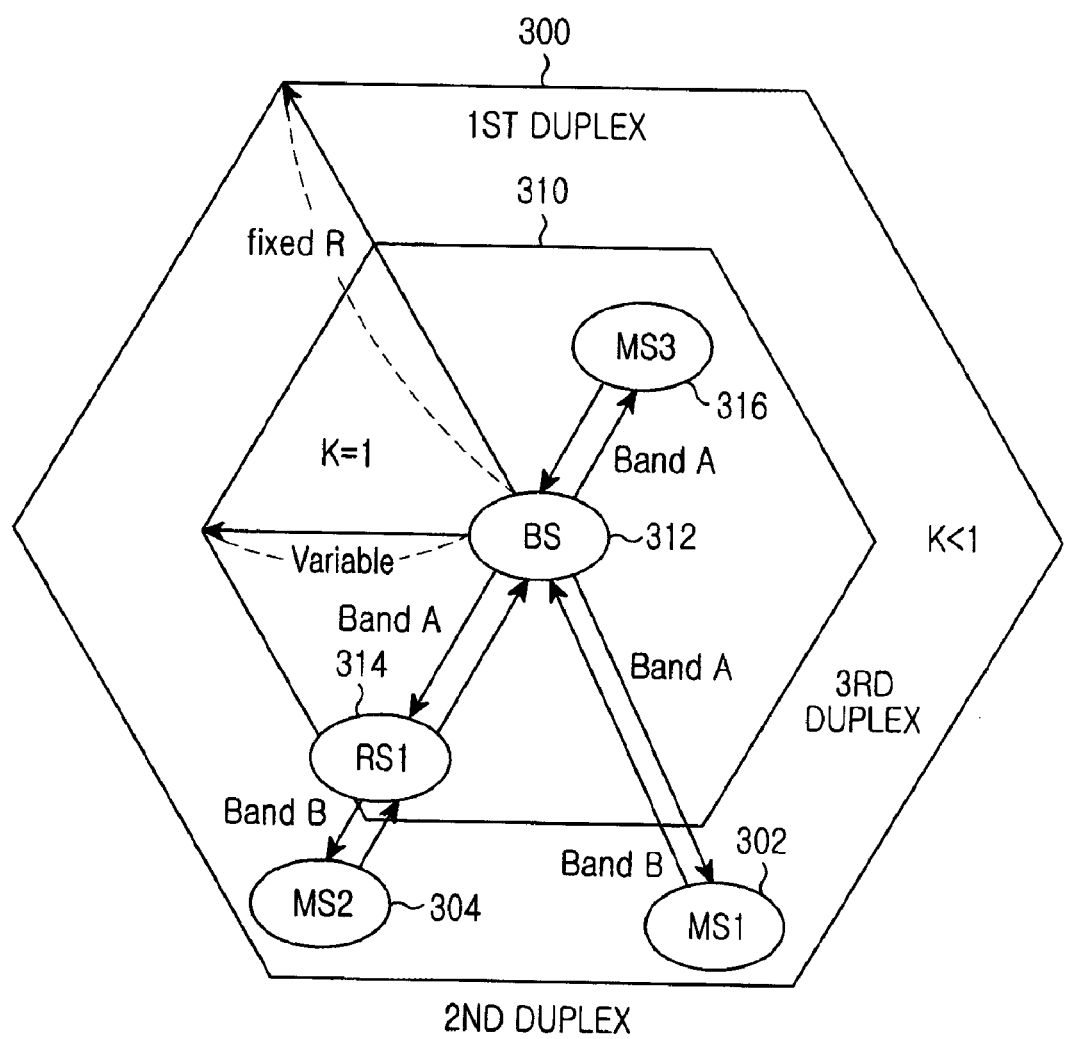
FIG. 3 is a diagram illustrating a relay system based on an HDD scheme according to an exemplary embodiment of the present invention.

FIG. 3 is a diagram illustrating a relay system based on an HDD scheme according to an exemplary embodiment of the present invention.

Referring to FIG. 3, a cell is divided into an inner region 310, which is a shorter distance from a BS 312 and an outer region 300, which is a longer distance from the BS 312. In an exemplary implementation as illustrated, the cell is assumed to use two different frequency bands (e.g. a frequency band A and a frequency band B) and to have one RS 314 for communication between the BS 312 and an MS1 302 and an MS2 304 located in the outer region 300. Of course, it is to be understood that this is by way of example only, and the number of RSs as well as the number of frequency bands is subject to change.

For communication with the BS 312, an MS3 316 located in the inner region 310 and the RS 314 use a first duplex method of transmitting/receiving data by applying a TDD method to a frequency band A.

The MS1 302 and the MS2 304 in the outer region 300 either communicate with the BS 312 via the RS 314 or directly communicate with the BS 312. For communication between the MS2 304 in the outer region 300 and the RS 314, a second duplex method of transmitting/receiving data is used by applying the TDD method to a frequency band B.

For direct communication between the BS 312 and the MS1 302 located in the outer region 300, a third duplex method of transmitting/receiving data is used by applying an FDD scheme that uses the frequency band B in a UL interval, and uses the frequency band A in a DL interval.

The first through the third duplex schemes use different UL/DL frequency reuse factors between adjacent cells. That is, the duplex schemes use a frequency reuse factor K=1 in the inner region 310, and use a frequency reuse factor K<1 in the outer region 300.

A radius r of the inner region 310 may vary according to a frequency reuse factor and an interference level between adjacent cells. In this case, the interference level between adjacent cells can be determined by measuring signal strength of an unused frequency band according to a frequency reuse factor allocated to each cell. The inner region 310 and the outer region 300 of the cell are separated according to the radius r of the inner region 310, and the RS 314 can be located in the cell's inner region 310, or can variably change in the cell's outer region 300 according to the distribution of MSs and the distribution of shadow areas. A radius R of the outer region 300 is fixed.

Figure 4:
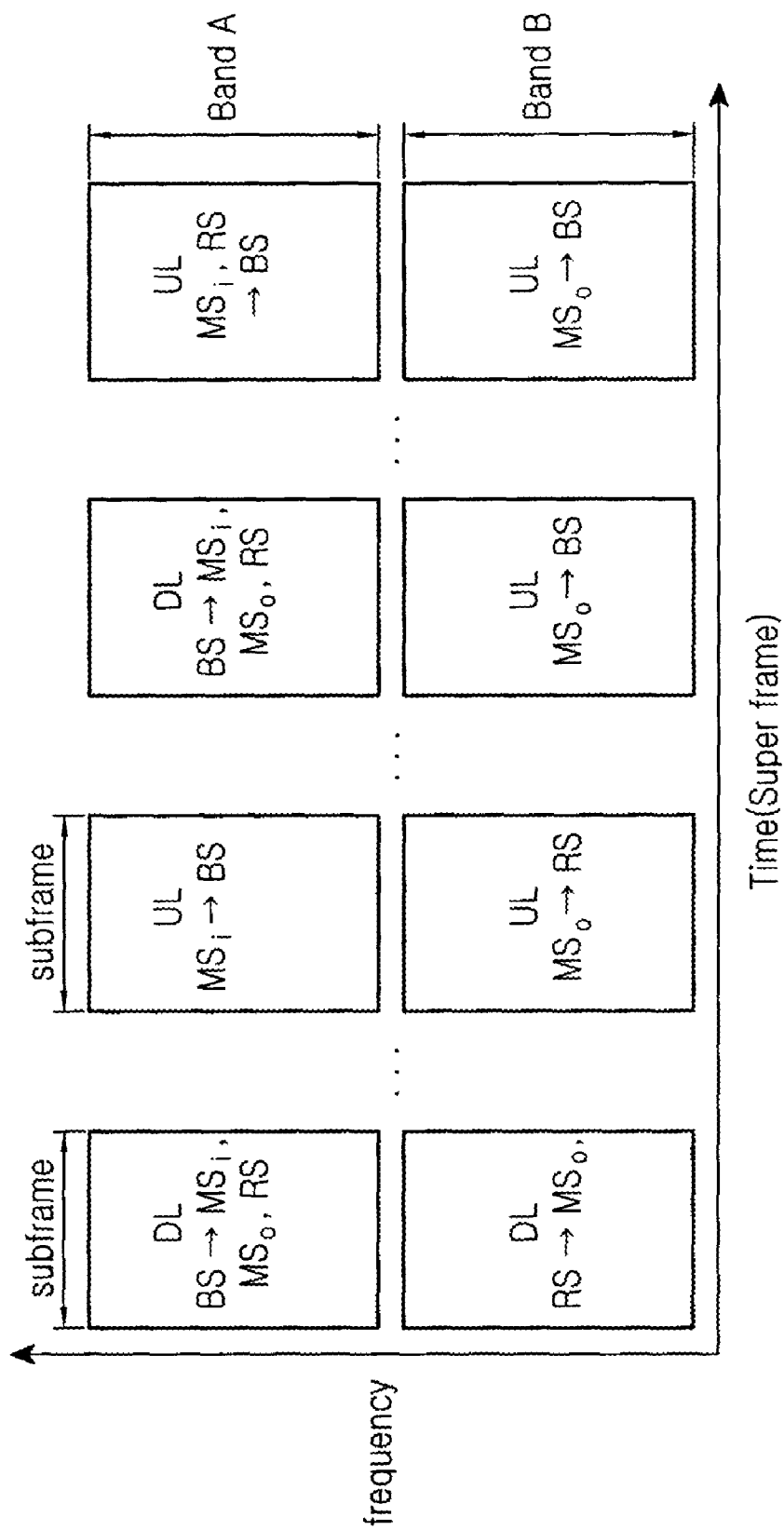
FIG. 4 is a diagram illustrating a frame structure according to an exemplary embodiment of the present invention.

FIG. 4 is a diagram illustrating a frame structure according to an exemplary embodiment of the present invention.

Referring to FIG. 4, one subframe is allocated to each of UL and DL intervals, and a group of the subframes constitutes one superframe-type frame structure.

Figure 5:
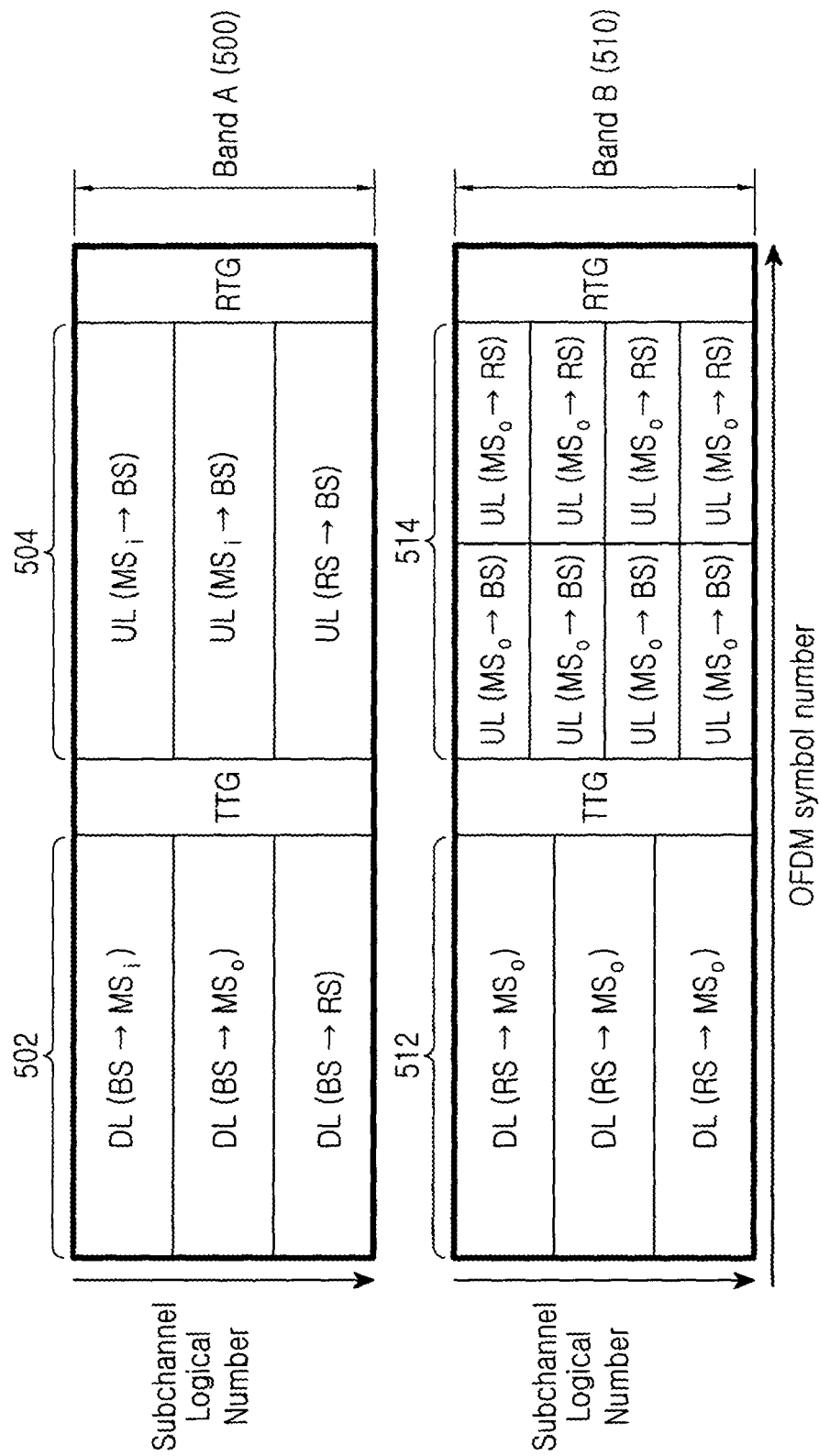
FIG. 5 is a diagram illustrating a frame structure to which a TDD-based double band-type HDD scheme is applied according to an exemplary embodiment of the present invention.

FIG. 5 is a diagram illustrating a frame structure to which a TDD-based double band-type HDD scheme is applied according to an exemplary embodiment of the present invention.

Referring to FIG. 5, for a frequency band A 500, a TDD scheme is applied in the first duplex scheme and an FDD scheme applied in the third duplex scheme. That is, in a DL interval 502 of the frequency band A 500, a DL subframe for each of an MS MS_i located in a cell's inner region, an MS MS_o located in a cell's outer region, and an RS is allocated from a BS. In a UL interval 504 spaced apart from the DL interval 502 by a Transmit/Receive Transition Gap (TTG), a UL subframe for the BS is allocated from each of an MS MS_i located in the cell's inner region and the RS. Thereafter, a DL interval spaced apart from the UL interval by a Receive/Transmit Transition Gap (RTG) follows the UL interval.

For a frequency band B 510, a TDD scheme is applied in the second duplex scheme, and the FDD scheme is applied in the third duplex scheme. That is, in a DL interval 512, a subframe between the RS and the MS_o is allocated. In a UL interval 514 spaced apart from the DL interval 512 by TTG, a UL subframe for each of the BS and the RS is allocated from the MS_o. Thereafter, a DL interval spaced apart from the UL interval by RTG follows the UL interval.

Figure 6:
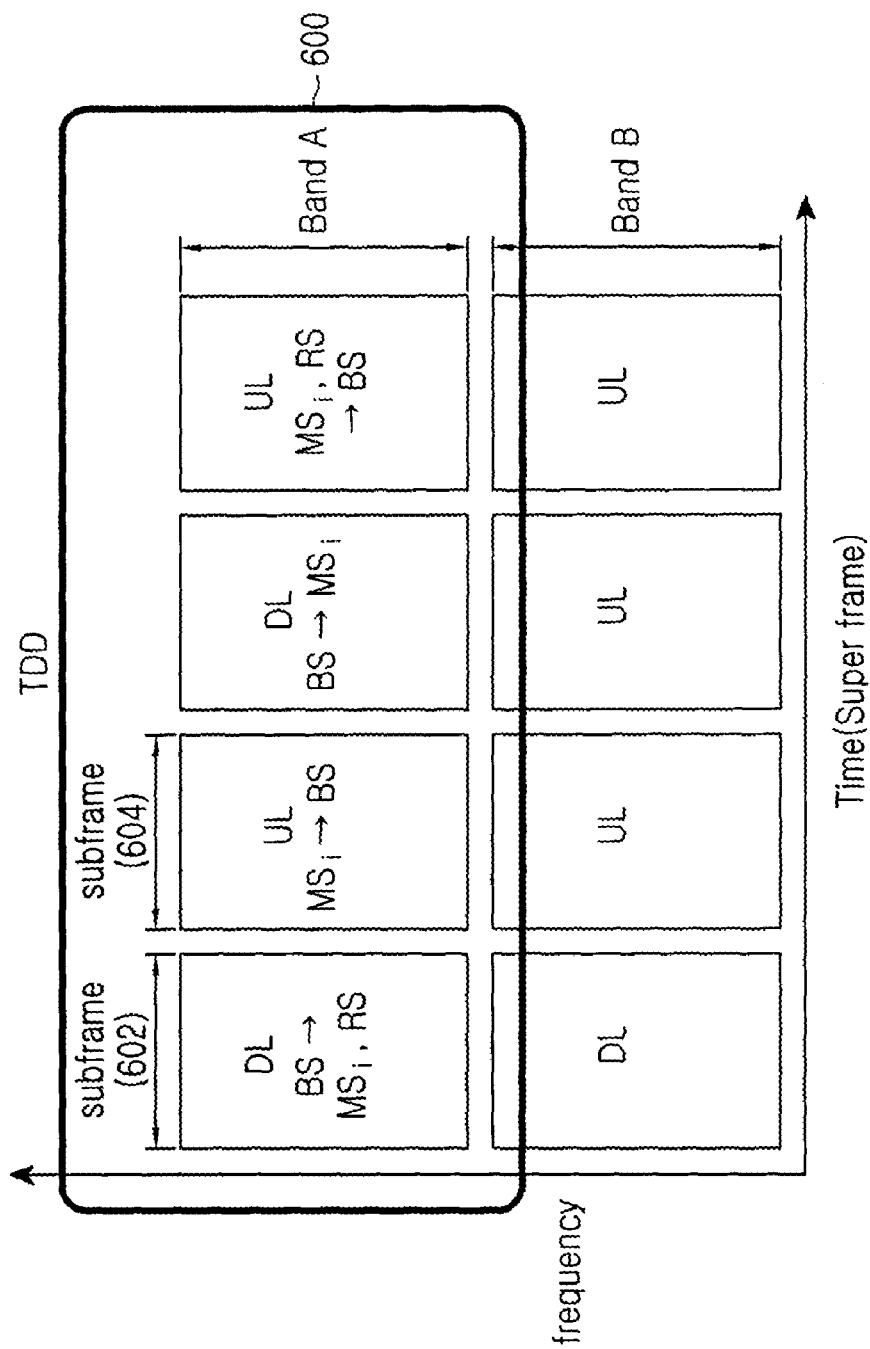
FIG. 6 is a diagram illustrating a frame structure to which a first duplex scheme is applied according to an exemplary embodiment of the present invention.
Figure 7:
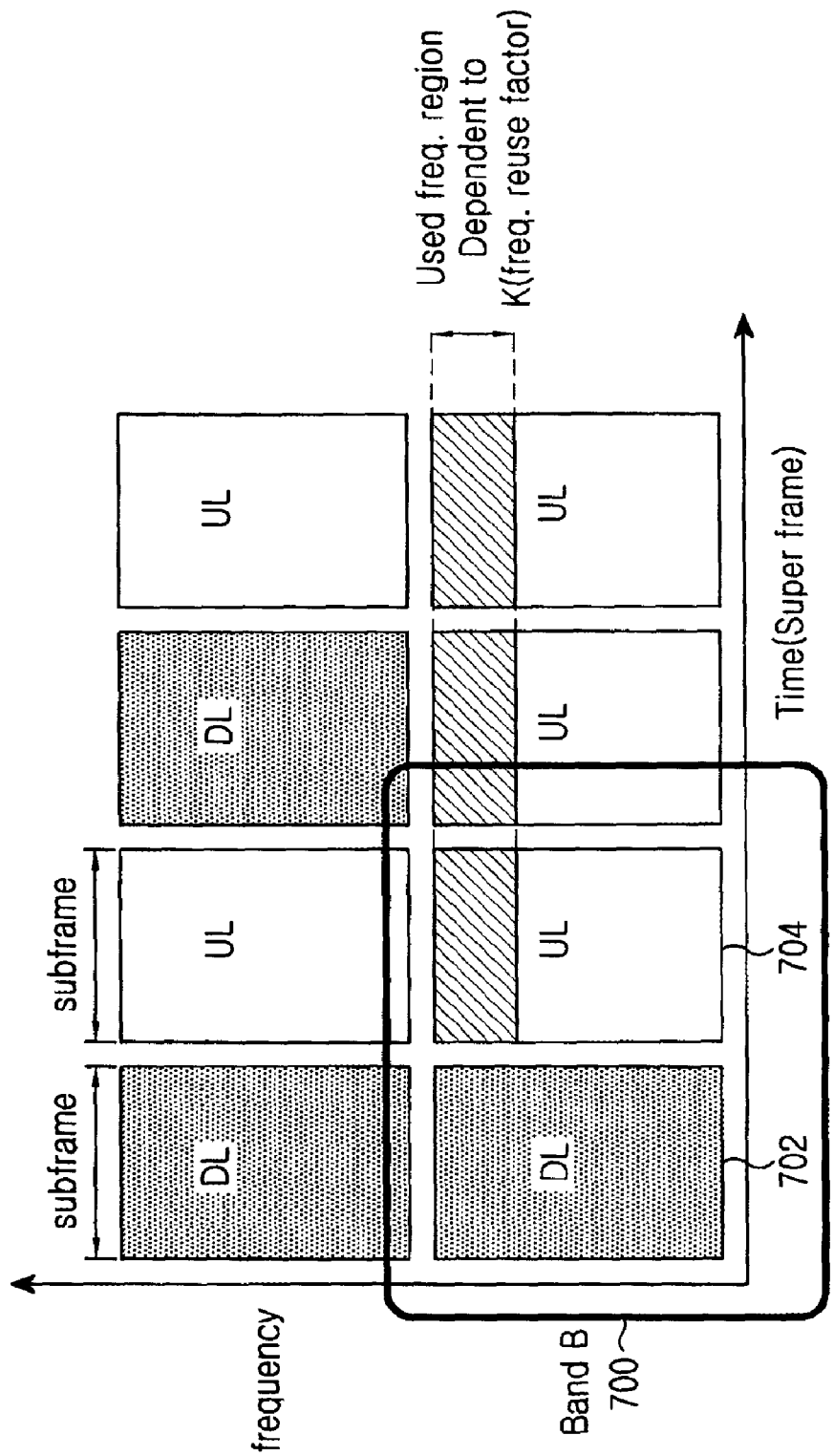
FIG. 7 is a diagram illustrating a frame structure to which a second duplex scheme is applied according to an exemplary embodiment of the present invention.
Figure 8:
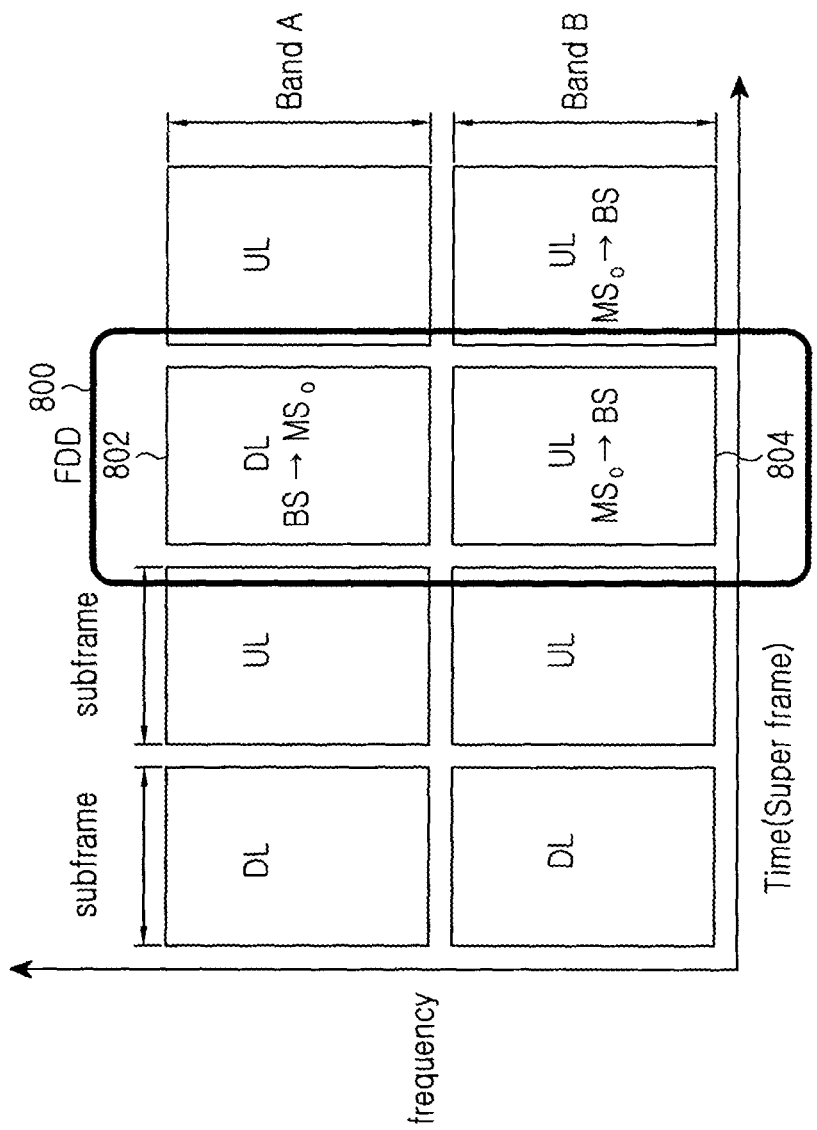
FIG. 8 is a diagram illustrating a frame structure to which a third duplex scheme is applied according to an exemplary embodiment of the present invention.

With reference to FIGS. 6 to 8, a detailed description will now be made of a frame structure to which the first through third duplex schemes are applied according to an exemplary embodiment of the present invention.

FIG. 6 is a diagram illustrating a frame structure to which a first duplex scheme is applied according to an exemplary embodiment of the present invention.

Referring to FIG. 6, in a frequency band A 600, subframes of UL and DL intervals are alternately allocated, by applying the TDD scheme according to the first duplex scheme. Here, a frequency reuse factor of the DL interval between an MS_i and a BS is 1.

A first subframe 602 is a subframe of the DL interval, with which the BS transmits data to an MS_i or an RS. A second subframe 604 is a subframe of the UL interval, with which the BS receives data from the MS_i. Thereafter, a third subframe is a subframe of the DL interval, with which the MS_i receives data from the BS, and a fourth subframe is a subframe of the UL interval, with which the MS_i or the RS transmits data to the BS.

FIG. 7 is a diagram illustrating a frame structure to which a second duplex scheme is applied according to an exemplary embodiment of the present invention.

Referring to FIG. 7, a first subframe 702 of a frequency band B 700 is a subframe of a DL interval, with which an RS transmits data to an MS_o. A second subframe 704 is a subframe of a UL interval, with which the MS_o transmits data to the RS, or the MS_o directly transmits data to the BS. A frequency reuse factor of the UL and DL intervals for the frequency band B, to which the FDD scheme is applied, is adjusted according to an interference level between adjacent cells. Here, signal strength of the frequency band currently used in the cell is determined and the determined signal strength is used as a criterion for determining the interference level between adjacent cells.

FIG. 8 is a diagram illustrating a frame structure to which a third duplex scheme is applied according to an exemplary embodiment of the present invention.

Referring to FIG. 8, an FDD scheme is applied for subframes 802 and 804 in the same time interval 800 according to the third duplex scheme. That is, a subframe 802 of the frequency band A is a subframe of a DL interval, with which a BS directly transmits data to an MS_o. A subframe 804 of the frequency band B in the same time interval 800 is a UL subframe with which the MS_o transmits data to the BS.

Exemplary embodiments of the present invention use different types of subchannels according to whether a location the corresponding MS belongs to a cell's outer region or a cell's inner region.

Figure 9A:
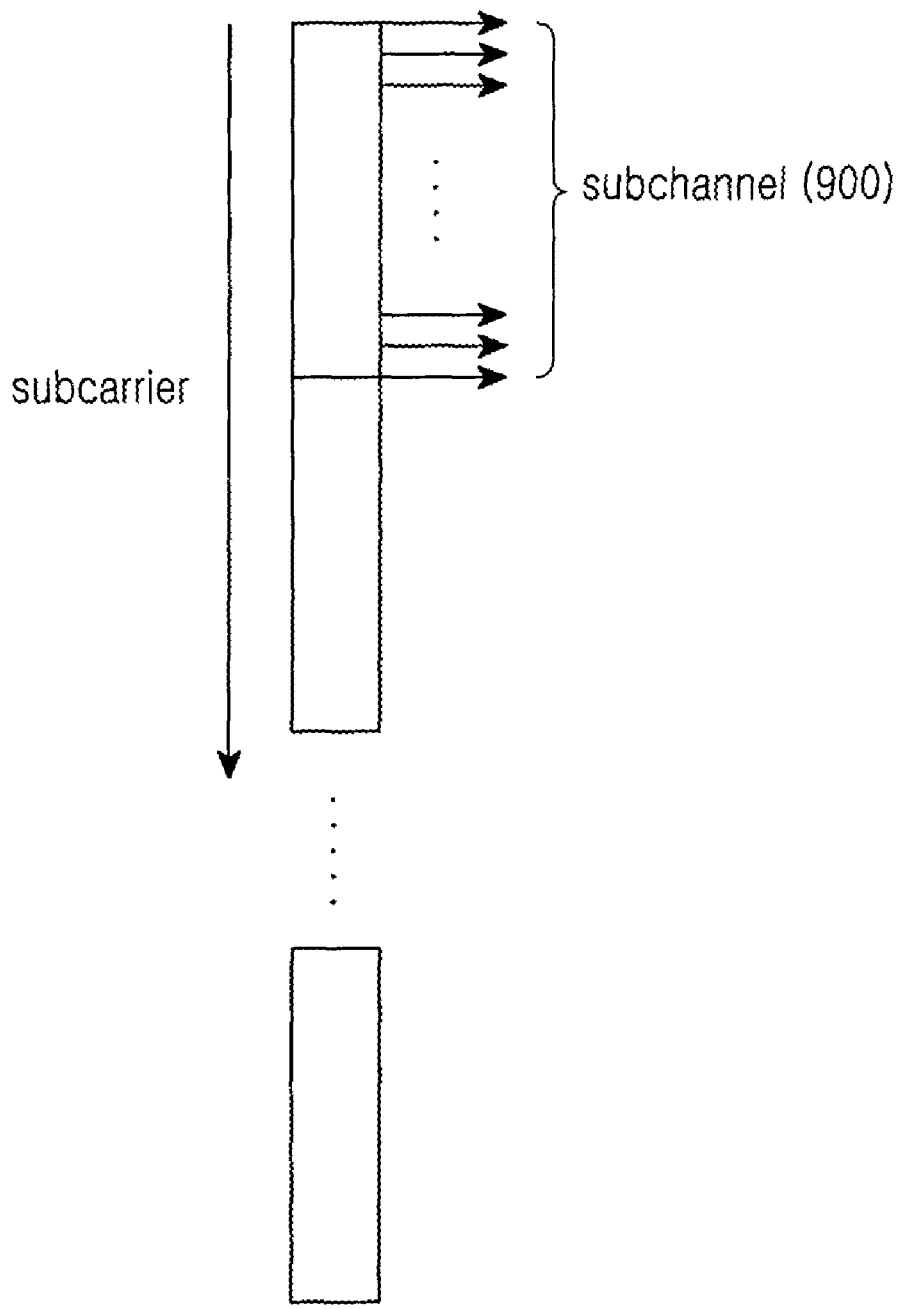
FIGS. 9A and 9B are diagrams illustrating patterns of subchannels according to exemplary embodiments of the present invention.
Figure 9B:
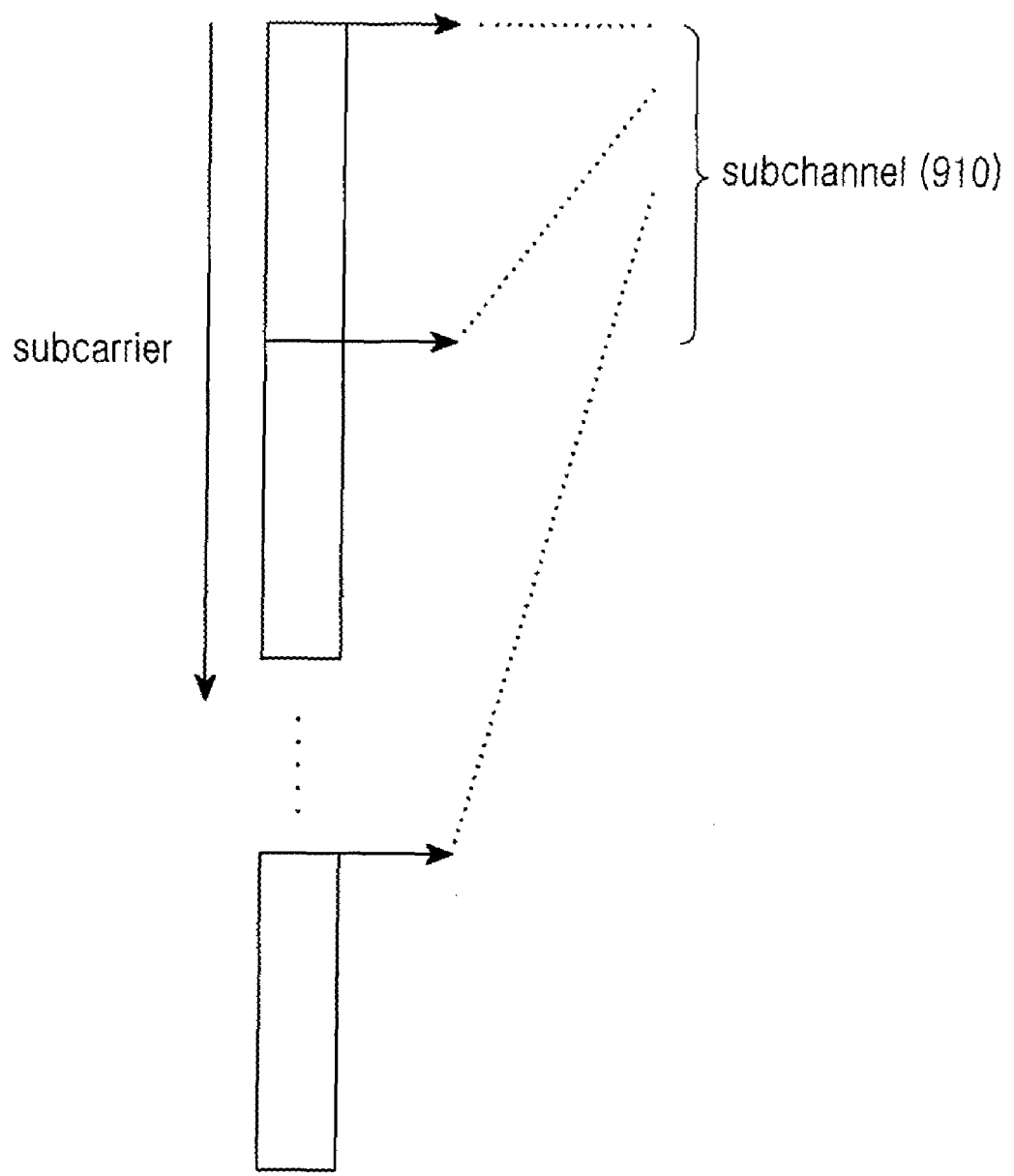

FIGS. 9A and 9B are diagrams illustrating patterns of subchannels according to exemplary embodiments of the present invention.

Referring to FIG. 9A, an MS located in a cell's inner region uses a subchannel 900 composed of subcarriers which are adjacent along the frequency domain.

Referring to FIG. 9B, an MS located in a cell's outer region uses a subchannel 910 composed of subcarriers which are distributed at regular intervals along the frequency domain.

Figure 10:
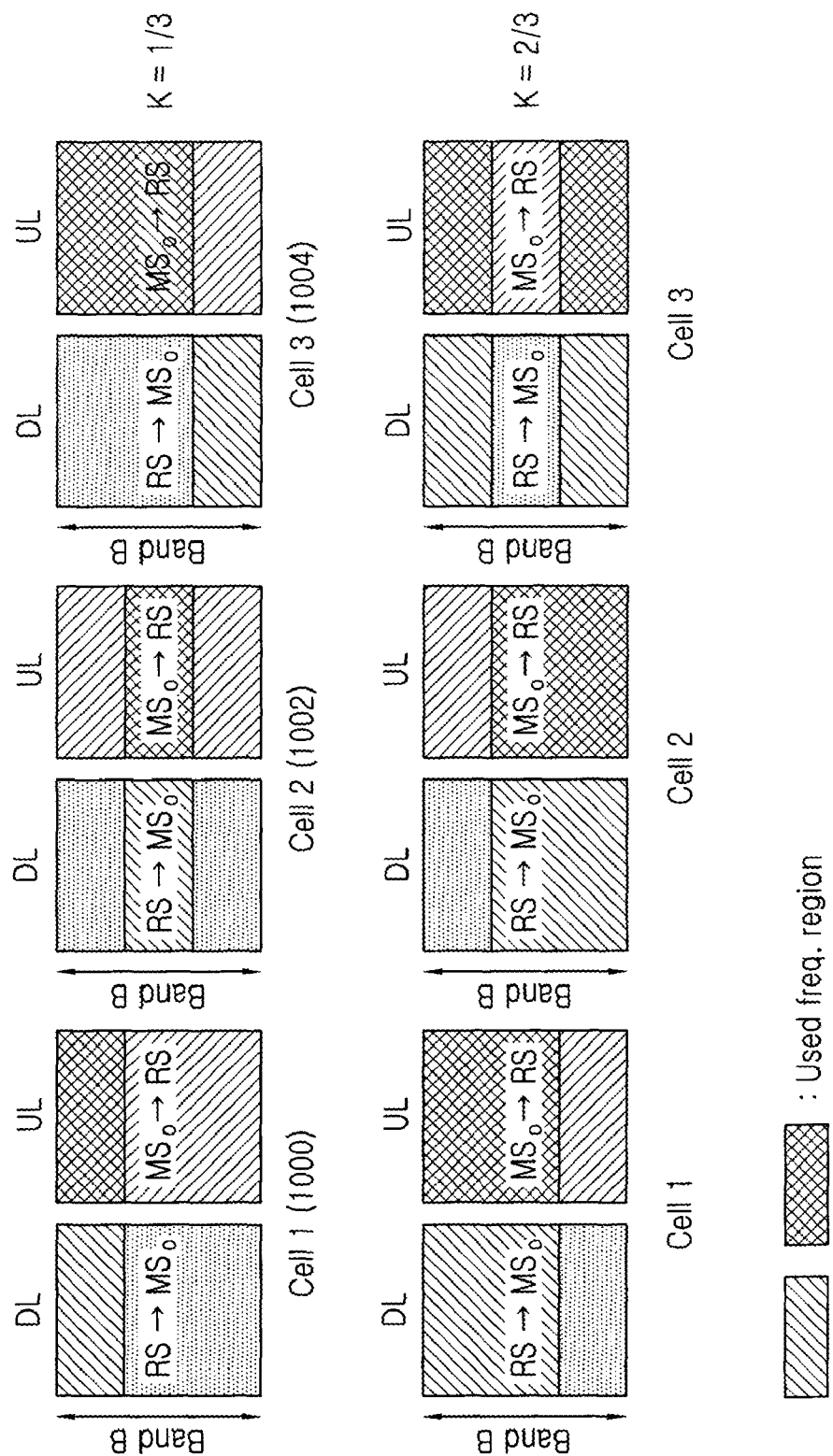
FIG. 10 is a diagram illustrating an example of a method for generating a subchannel of each cell according to an exemplary embodiment of the present invention.

FIG. 10 is a diagram illustrating a method for generating a subchannel of each cell according to an exemplary embodiment of the present invention. A description thereof will be made herein for a frequency reuse factor of ⅓ and a frequency reuse factor of ⅔, by way of example. It is to be understood that these frequency reuse factors are merely exemplary and other reuse factors may be used in their place.

Referring to FIG. 10, if it is assumed that perfect cell planning is possible, a subchannel of each cell is composed of the same subcarriers. That is, subcarriers of a subchannel in a cell#1 1000, subcarriers of a subchannel in a cell#2 1002, and subcarriers of a subchannel in a cell#3 1004 are equal to one another.

Figure 11:
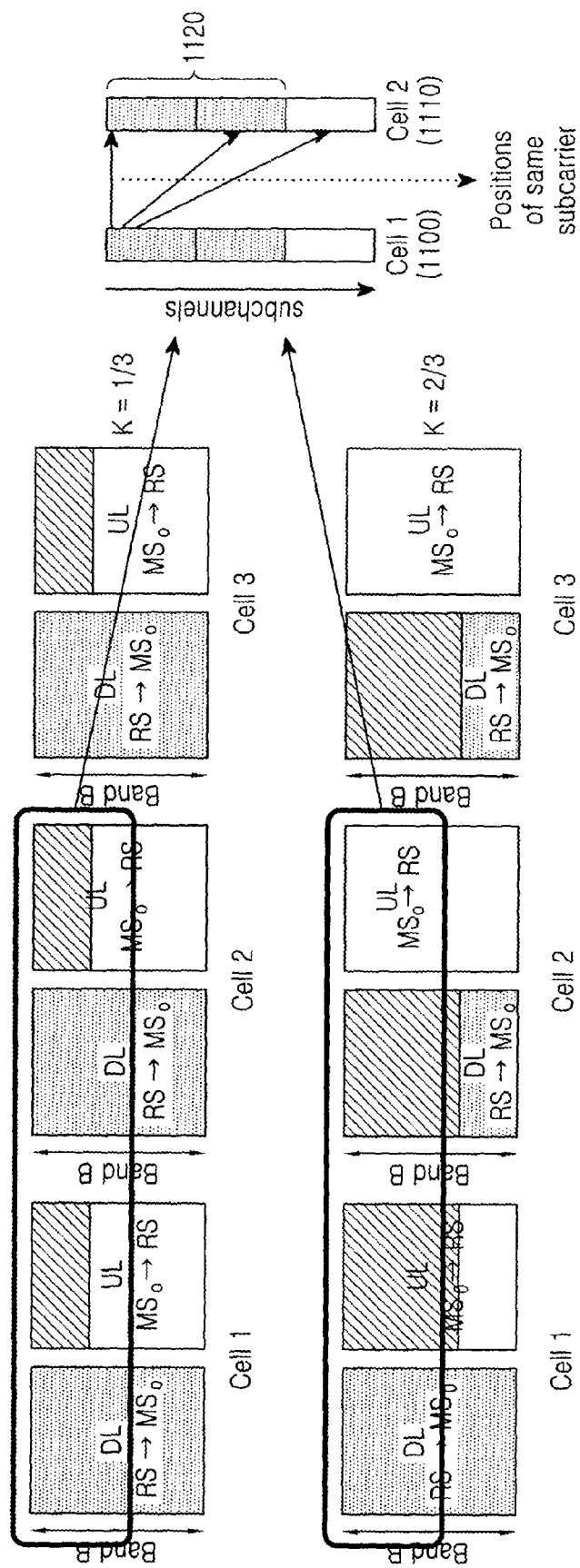
FIG. 11 is a diagram illustrating another example of a method for generating a subchannel of each cell according to an exemplary embodiment of the present invention.

FIG. 11 is a diagram illustrating another example of a method for generating a subchannel of each cell according to an exemplary embodiment of the present invention.

Referring to FIG. 11, there is a case where it is difficult to separate a subchannel used in each cell. Therefore, only some of subcarriers constituting a subchannel of each cell are equal to corresponding ones of subcarriers constituting a subchannel of an adjacent cell. It is assumed herein that the frequency reuse factor is ⅓. That is, subchannels of a cell#1 1100 and a cell#2 1110 each are composed of 3 subcarriers, and the cells are equal in 2 of the 3 subcarriers.

When MSs are allocated for each subframe, an MS that will communicate with an RS is allocated taking into account a Signal-to-Noise Ratio (SNR) between the BS and the MS in a frequency band A, an SNR between the BS and the MS in a frequency band B and an SNR between the RS and the MS in the frequency band B. In addition, subchannels, transmission power and transmission methods are determined for communication between the BS and the RS and communication between the RS and the MS.

Among MSs located in the outer region of the cell, an MS having a greater difference between an SNR between the corresponding MS and the BS and an SNR between the corresponding MS and the RS is first allocated to the corresponding RS.

When the third duplex scheme is used, signal strength of a frequency band currently unused in the cell is measured and the measured signal strength is used as a criterion for determining an interference level between adjacent cells. An adaptive frequency reuse factor is provided that can increase or decrease a frequency reuse factor of the DL interval according to the interference level between adjacent cells. If the DL interval to which the third duplex scheme is applied is assumed to be allocated using the frequency band A, a frequency reuse factor is determined taking into account DL resources of the first duplex scheme. That is, when a BS directly communicates with an MS_o, since its interference to/from an adjacent cell's MS increases, it cannot use a frequency reuse factor K=1. Therefore, DL resources used for communication with the cell's outer region have different frequency reuse factors from the MSs allocated in the cell's inner region.

In this case, the DL frequency reuse factor allocated to the MS located in the cell's outer region is flexible as its cell planning is simple, and the corresponding MS is also flexibly allocated the resources which are allocated for the DL according to the first duplex scheme.

Figure 12A:
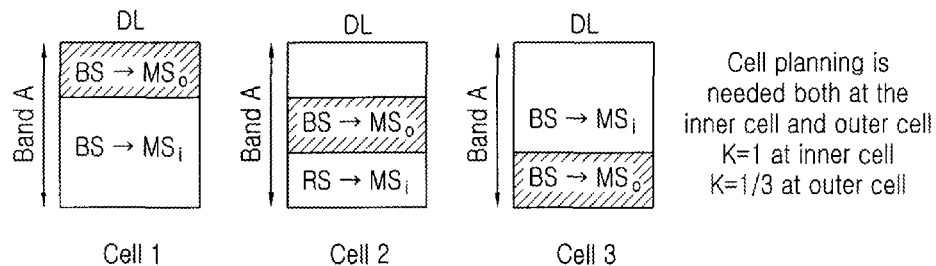
FIGS. 12A and 12B are diagrams illustrating a method for performing cell planning of an MS located in a cell's outer region according to an exemplary embodiment of the present invention.
Figure 12B:
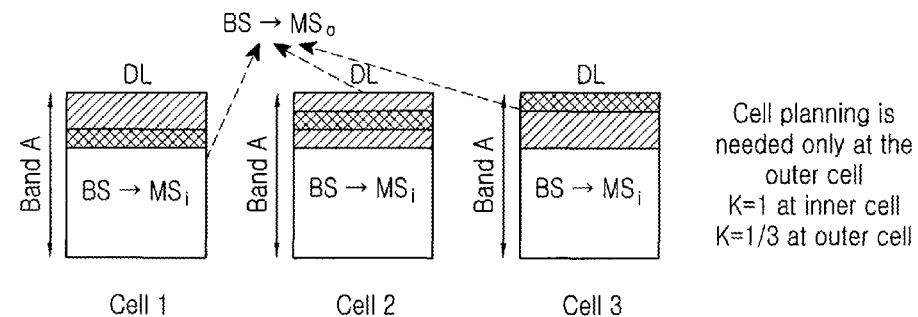

FIGS. 12A and 12B are diagrams illustrating a method for performing cell planning for an MS located in a cell's outer region according to an exemplary embodiment of the present invention.

Herein, the cell's outer region uses a frequency reuse factor K=⅓ and the cell's inner region uses a frequency reuse factor K=1. In the DL interval of each cell, the shaded part represents an interval allocated for the cell's outer region, and the non-shaded part represents an interval allocated for the cell's inner region.

Referring to FIG. 12A, the cells undergo cell planning taking both the cell's inner region and the cell's outer region into consideration. In the frequency band A, cell#1, cell#2 and cell#3 allocate DL between the BS and MS_o, and DL between the BS and MS_i.

Referring to FIG. 12B, the cells undergo cell planning taking only the cell's outer region into account. A part of the frequency band A is established as a region for the outer region and, by adjusting a frequency reuse factor in the corresponding region, a region to be used in each of cell#1 through cell#3 is allocated. Herein, ⅓ of the cell is established as the region for the cell's outer region, and ⅓ of the corresponding region, i.e., ⅑ of the entire cell, is allocated as a DL between the BS and MS_o.

Another exemplary embodiment of the present invention allocates DL and UL resources to a frequency band A and a frequency band B symmetrically or asymmetrically according to each duplex scheme taking into account the required amount of resources of the corresponding system.

Figure 13A:
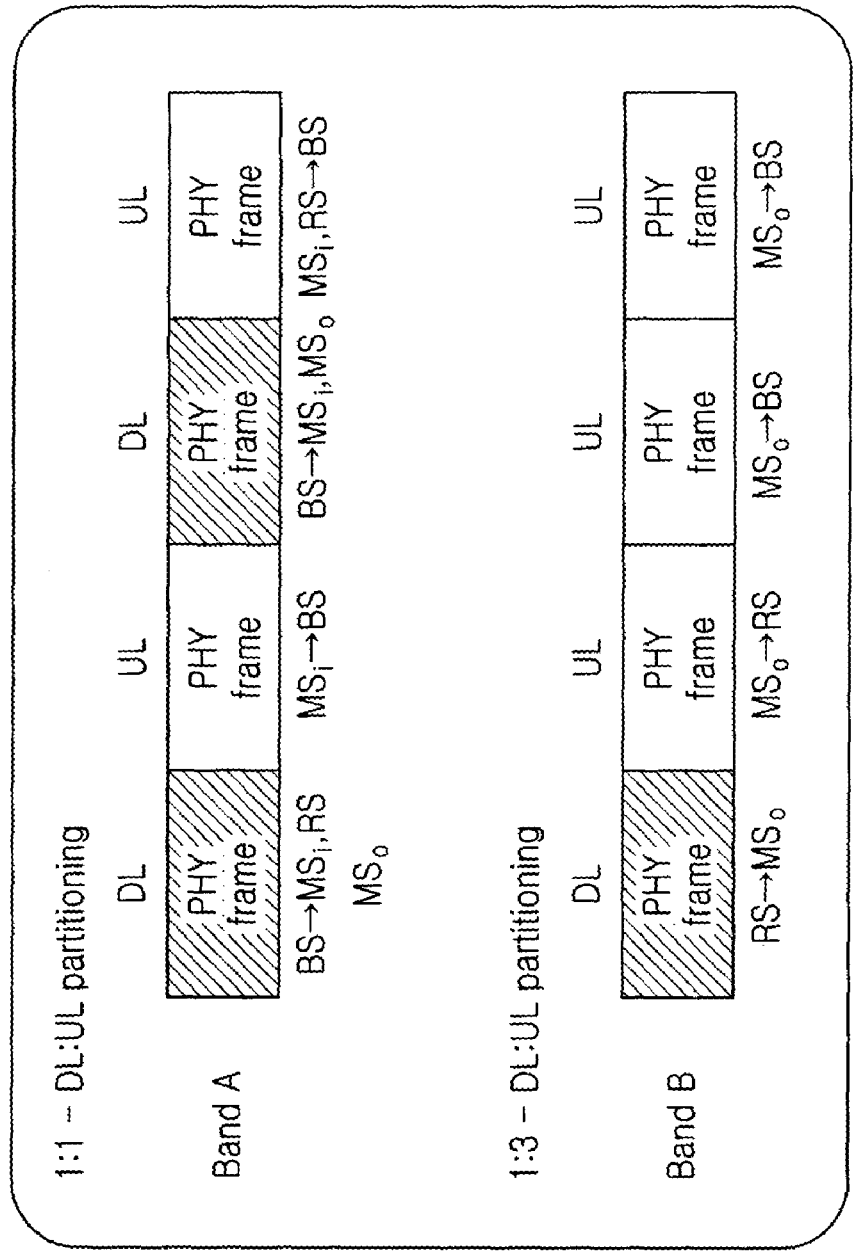
FIGS. 13A and 13B are diagrams illustrating examples of UL/DL resources allocated symmetrically or asymmetrically according to exemplary embodiments of the present invention.
Figure 13B:
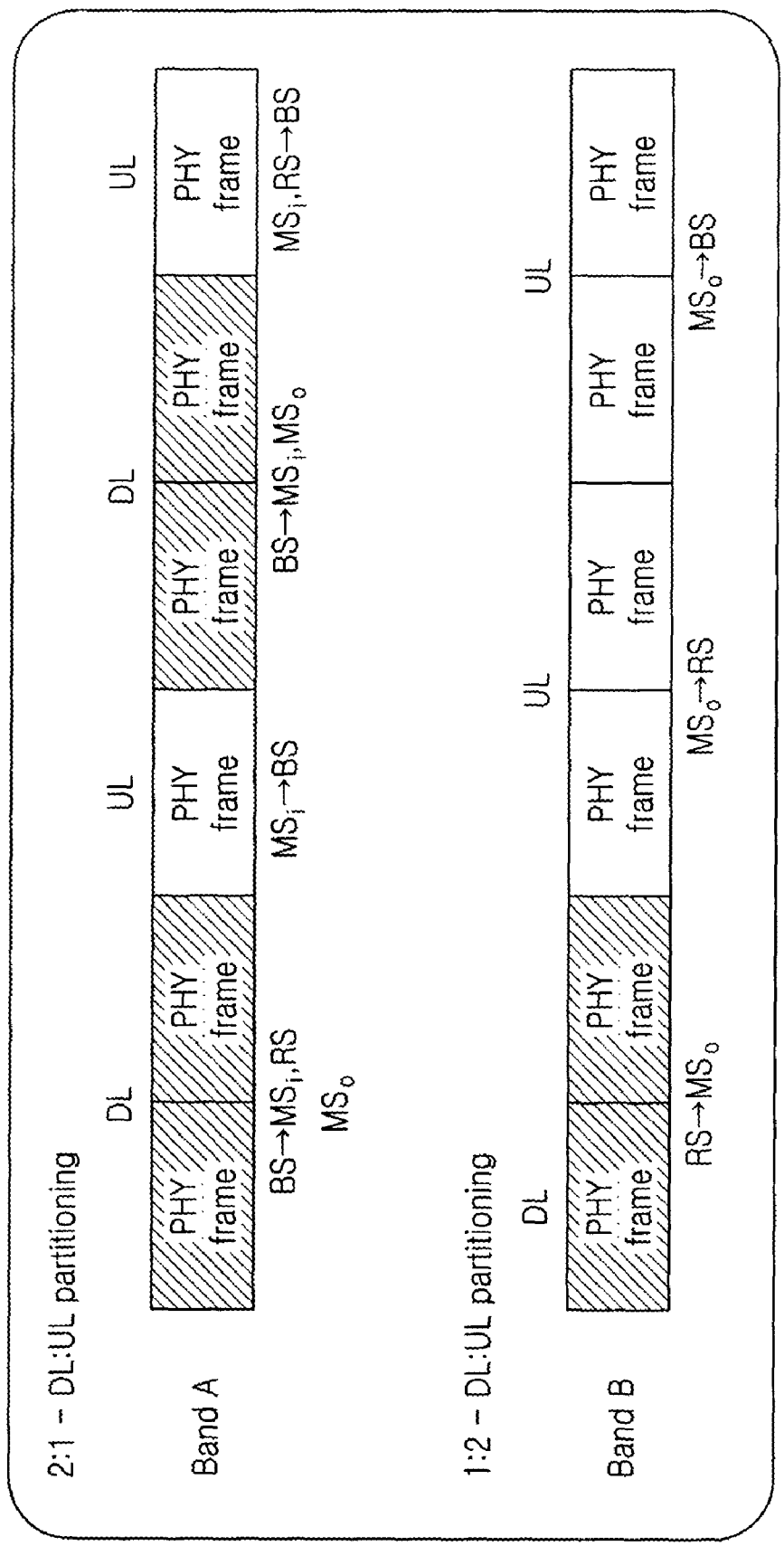

FIGS. 13A and 13B are diagrams illustrating examples of UL/DL resources allocated symmetrically or asymmetrically according to exemplary embodiments of the present invention.

Referring to FIG. 13A, in a frequency band A, resources of the DL and UL intervals are allocated symmetrically using a ratio 1:1. A first DL subframe is used for communication between the BS and MS_i, and between the RS and MS_o. Next, a first UL subframe is used for communication between the MS_i and BS. A second DL subframe is used for communication between the BS and MS_i and between the BS and MS_o, and finally, a second UL subframe is used for communication between the MS_i and BS and between the RS and BS.

In a frequency band B, resources of the DL and UL intervals are allocated asymmetrically using a 1:3 ratio. A first DL subframe is used for communication between the RS and MS_o. Next, a first UL subframe is used for communication between the MS_o and RS, and a second UL subframe is used for communication between the MS_o and BS. Finally, a third UL subframe is used for communication between the MS_o and BS.

Referring to FIG. 13B, in a frequency band A, resources of DL and UL intervals are allocated asymmetrically using a 2:1 ratio. Consecutive first and second DL subframes are used for communication between the BS and MS_i and between the RS and MS_o, and a first UL subframe is used for communication between the MS_i and BS. Consecutive third and fourth DL subframes are used for communication between the BS and MS_i and between BS and MS_o, and finally, a second UL subframe is used for communication between the MS_i and BS and between the RS and BS.

In a frequency band B, resources of DL and UL intervals are allocated asymmetrically using a 1:2 ratio. Consecutive first and second DL subframes are used for communication between the RS and MS_o. Next, consecutive first and second UL subframes are used for communication between the MS_o and RS, and consecutive third and fourth UL subframes are used for communication between the MS_o and BS.

Figure 14:
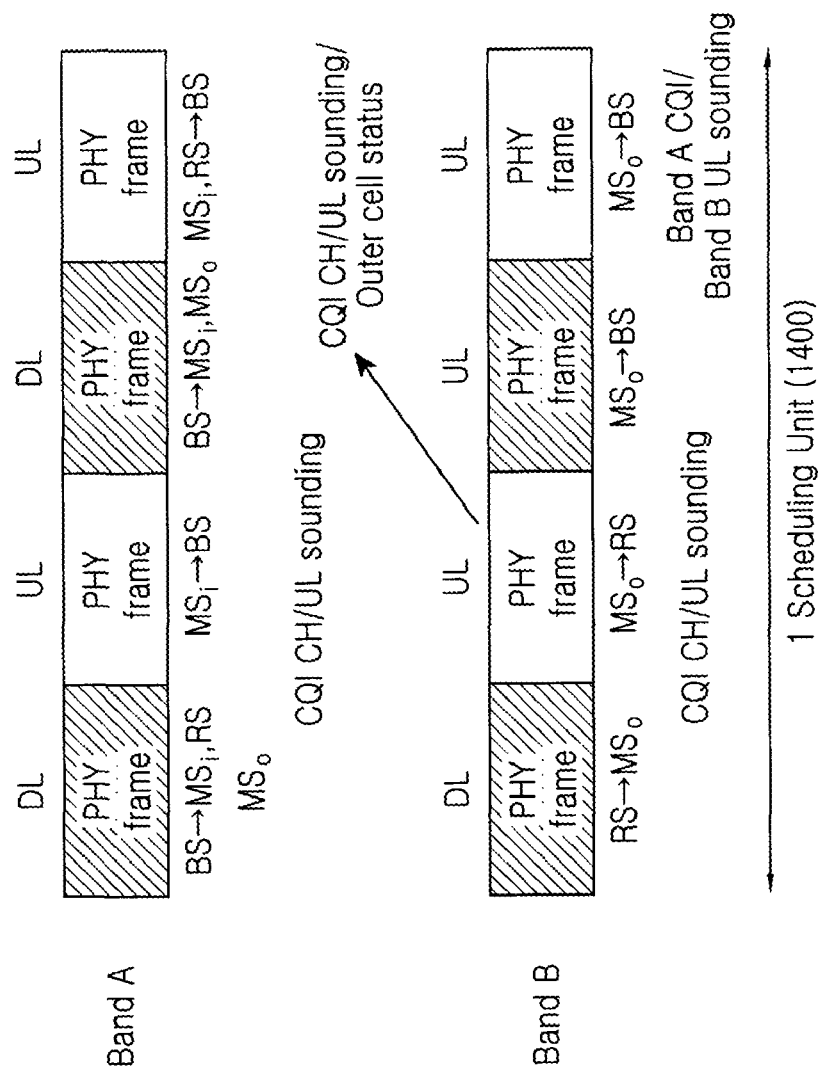
FIG. 14 is a diagram illustrating an example of generating a superframe composed of multiple subframes, which is a scheduling unit, according to an exemplary embodiment of the present invention.

FIG. 14 is a diagram illustrating an example of generating a superframe composed of multiple subframes, which is a scheduling unit, according to an exemplary embodiment of the present invention.

Referring to FIG. 14, a superframe 1400 is composed of 2 DL subframes and 2 UL subframes for each of frequency band A and a frequency band B.

First, a first DL subframe of the frequency band A is used for communication between the BS and MS_i, RS and MS_o, and a second DL subframe is used for communication between the BS and MS_i and between the BS and MS_o. A first UL subframe of the frequency band A is used for communication between the MS_i and BS, and a second UL subframe is used for communication between the MS_i and BS and between the RS and BS.

Next, a first DL subframe of the frequency band B is used for communication between RS and MS_o, and a second UL subframe is used for communication between MS_o and RS. Third and fourth UL subframes of the frequency band B are used for communication between MS_o and BS.

Figure 15:
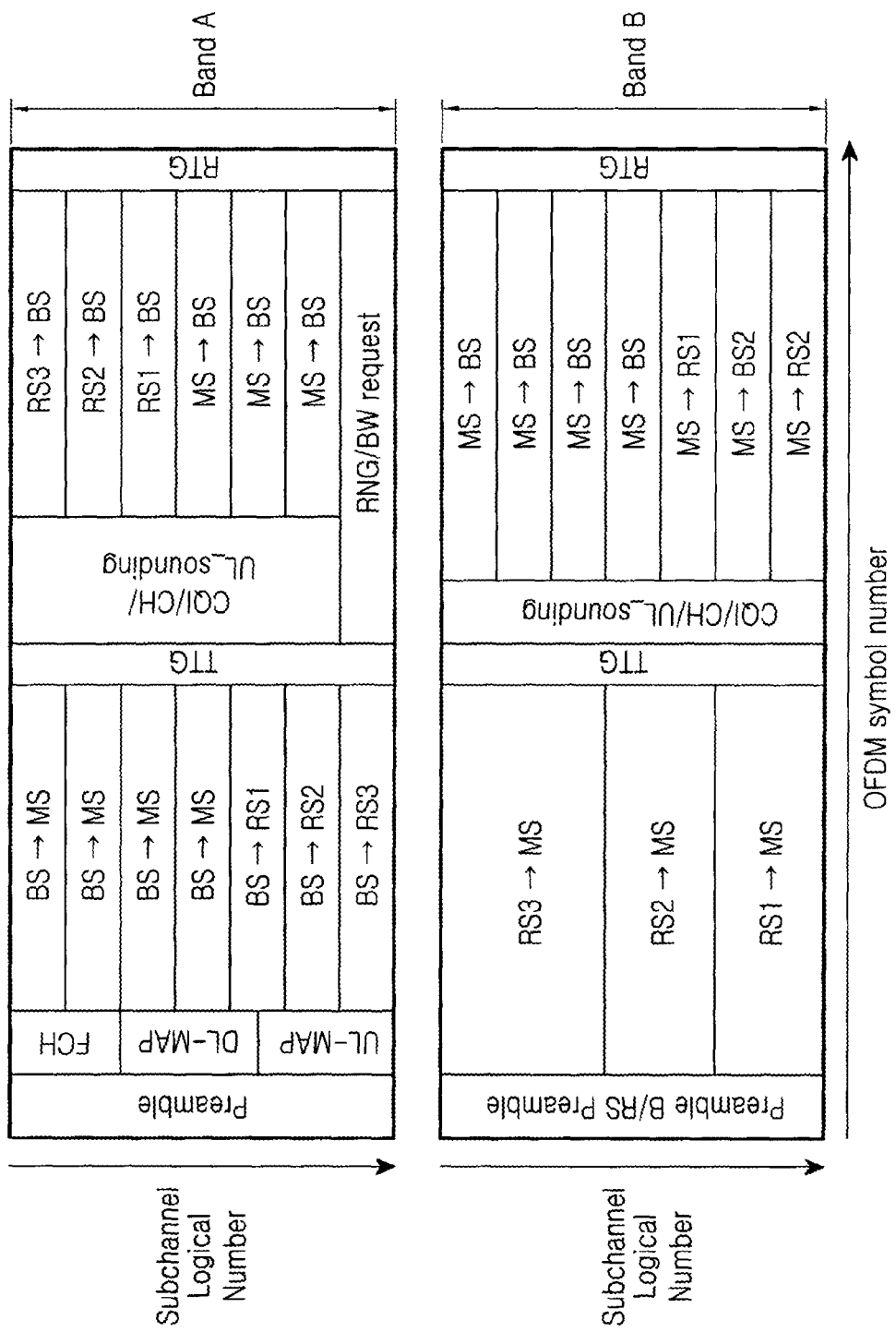
FIG. 15 is a diagram schematically illustrating a frame structure according to an exemplary embodiment of the present invention.

FIG. 15 is a diagram schematically illustrating a frame structure according to an exemplary embodiment of the present invention.

Referring to FIG. 15, in a frame of a frequency band A, Fundamental Channel (FCH), DL_MAP and UL_MAP are located after a preamble for synchronization, and DL resources between the BS and MSs and between the BS and RSs are allocated. A Channel Quality Information (CQI)/Channel/UL_Sounding subframe is located after a TTG, UL resources between the RSs and BS and between the MSs and BS are allocated, and an RTG is located thereafter.

In a frame of a frequency band B, DL resources between the RSs to MS are allocated after a preamble. A CQI/Channel/UL_Sounding subframe is located after a TTG, UL resources between the MS and BS and between the MS and RSs are allocated, and an RTG is located thereafter. As shown in FIG. 15, one frame constitutes a scheduling unit.

Figure 16:
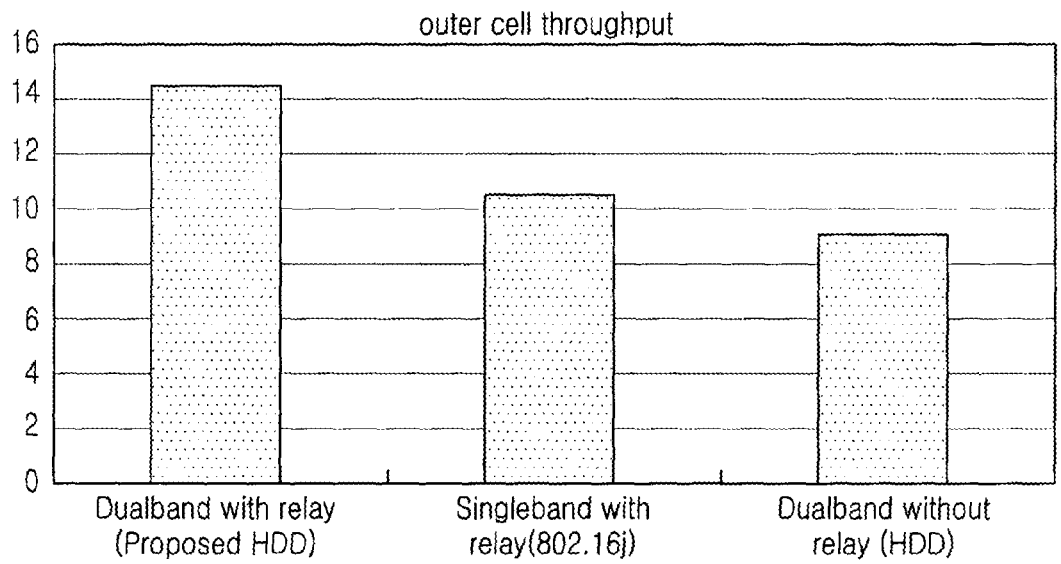
FIG. 16 is a graph illustrating performance of an exemplary embodiment of the present invention.
Figure 16:
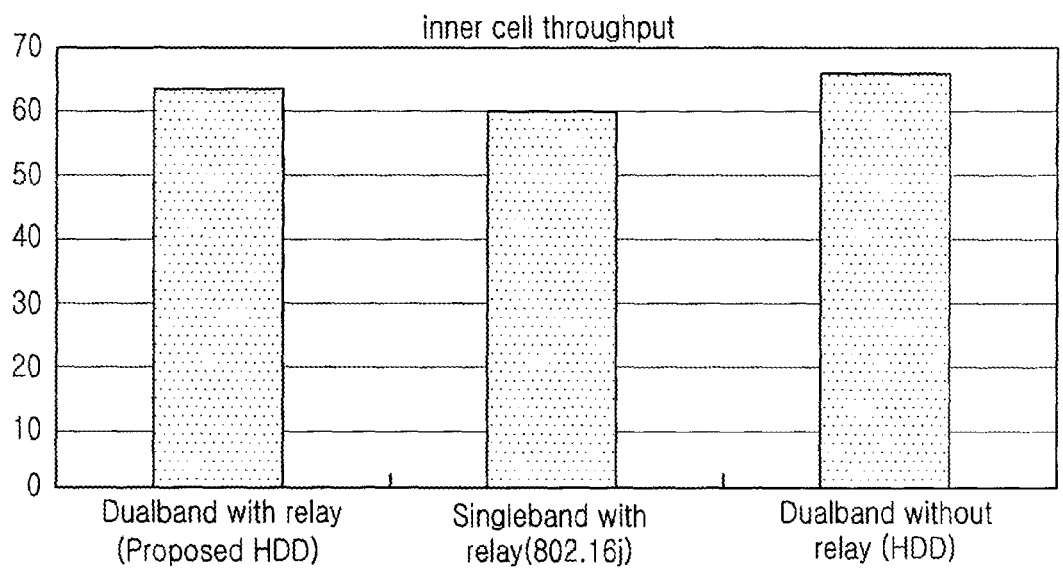

FIG. 16 is a graph illustrating performance of an exemplary embodiment of the present invention.

Referring to FIG. 16, it can be appreciated that the dual-band HDD system using RS(s) in the cell's outer region and the cell's inner region, compared to the conventional system not using RS(s), increases in the HDD performance at the cell's outer region. It addition, it can be noted that a single-band system, when its guard interval is not long enough, may suffer inter-carrier interference, causing performance degradation.

As a result, it is shown that the dual-band HHD system using RS(s) in the cell's outer region and the cell's inner region exhibits higher performance as compared to the existing HDD system without RS and the single-band system with only RS(s).

Figure 17:
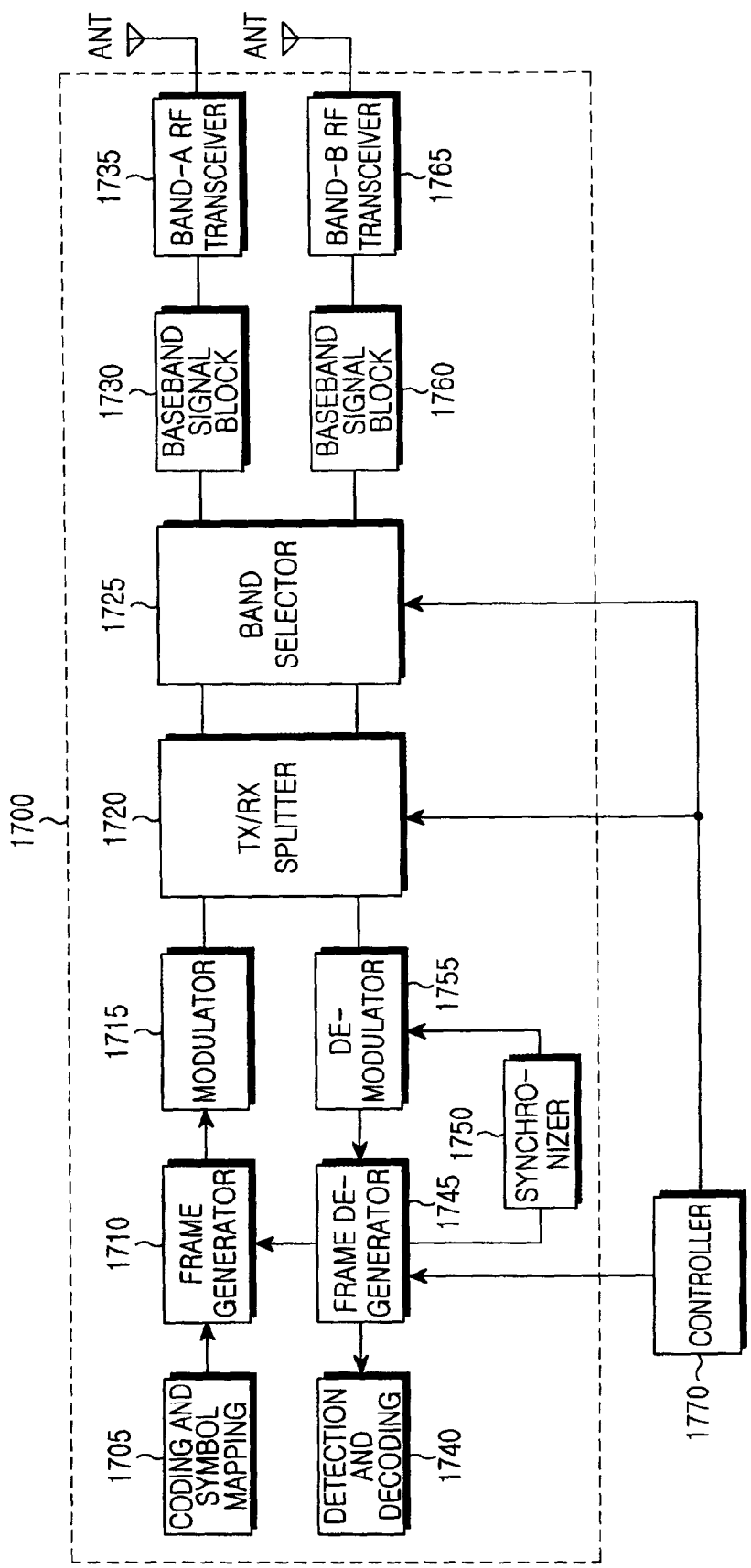
FIG. 17 is a diagram illustrating a structure of an MS according to an exemplary embodiment of the present invention.

FIG. 17 is a diagram illustrating a structure of an MS according to an exemplary embodiment of the present invention.

Referring to FIG. 17, an MS 1700 includes a coding and symbol mapping unit 1705, a frame generator 1710, a modulator 1715, a Transmission/Reception (Tx/Rx) splitter 1720, a band selector 1725, a baseband signal block 1730, a frequency band-A Radio Frequency (RF) transceiver 1735, a detection and decoding unit 1740, a frame de-generator 1745, a synchronizer 1750, a demodulator 1755, a baseband signal block 1760, a frequency band-B RF transceiver 1765, and a controller 1770.

The coding and symbol mapping unit 1705 outputs desired transmission data, a control signal, and a UL sounding signal to the frame generator 1710. Based on frame configuration information received from the controller 1770, the frame generator 1710 generates a frame configured in the form of FIG. 15 using the received data and control signal, and outputs the generated frame to the modulator 1715. The modulator 1715 modulates the frame, generates a transmission symbol using a pulse shaping filter, and then outputs the result to the Tx/Rx splitter 1720.

The Tx/Rx splitter 1720 determines a transmission slot and a reception slot of each band for data exchange with an RS or a BS according to transmission/reception time information received from the controller 1770, and outputs the result to the band selector 1725. The band selector 1725 determines a transmission slot and a reception slot for each of transmission and reception bands for data exchange with the RS or the BS according to path information received from the controller 1770. The first through third duplex methods are determined depending on the band and time slots determined by means of the Tx/Rx splitter 1720 and the band selector 1725.

The band selector 1725 selects a frequency band corresponding to the determined duplex method. When the frequency band is selected, the data scheduled to use the selected frequency band is delivered to the corresponding BS or RS by way of the frequency band-A RF transceiver 1735 or the frequency band-B RF transceiver 1765 after undergoing the baseband signal block 1730 or 1760.

The data received via the BS or the RS is delivered from the band selector 1725 to the Tx/Rx splitter 1720 by way of the frequency band-A RF transceiver 1735 or the frequency band-B RF transceiver 1765 and the baseband signal block 1730 or 1760 according to the corresponding frequency band. Thereafter, the received data is demodulated by means of the demodulator 1755, and then separated into a control signal and data by means of the frame de-generator 1745. The frame de-generator 1745 delivers a pilot and a preamble included in the separated control signal to the synchronizer 1750. The synchronizer 1750 performs synchronization with the BS or the RS according to the received pilot and preamble.

The data signal and control signal output by means of the frame de-generator 1745 are decoded in the detection and decoding unit 1740.

The controller 1770 controls the frame generator 1710 and the frame de-generator 1745 using channel state information received from the BS or the RS, and location information necessary for communication with each of the BS and the RS, and its own location information, and delivers transmission/reception time information and path information for determining an appropriate duplex method, to the Tx/Rx splitter 1720 and the band selector 1725.

Figure 18:
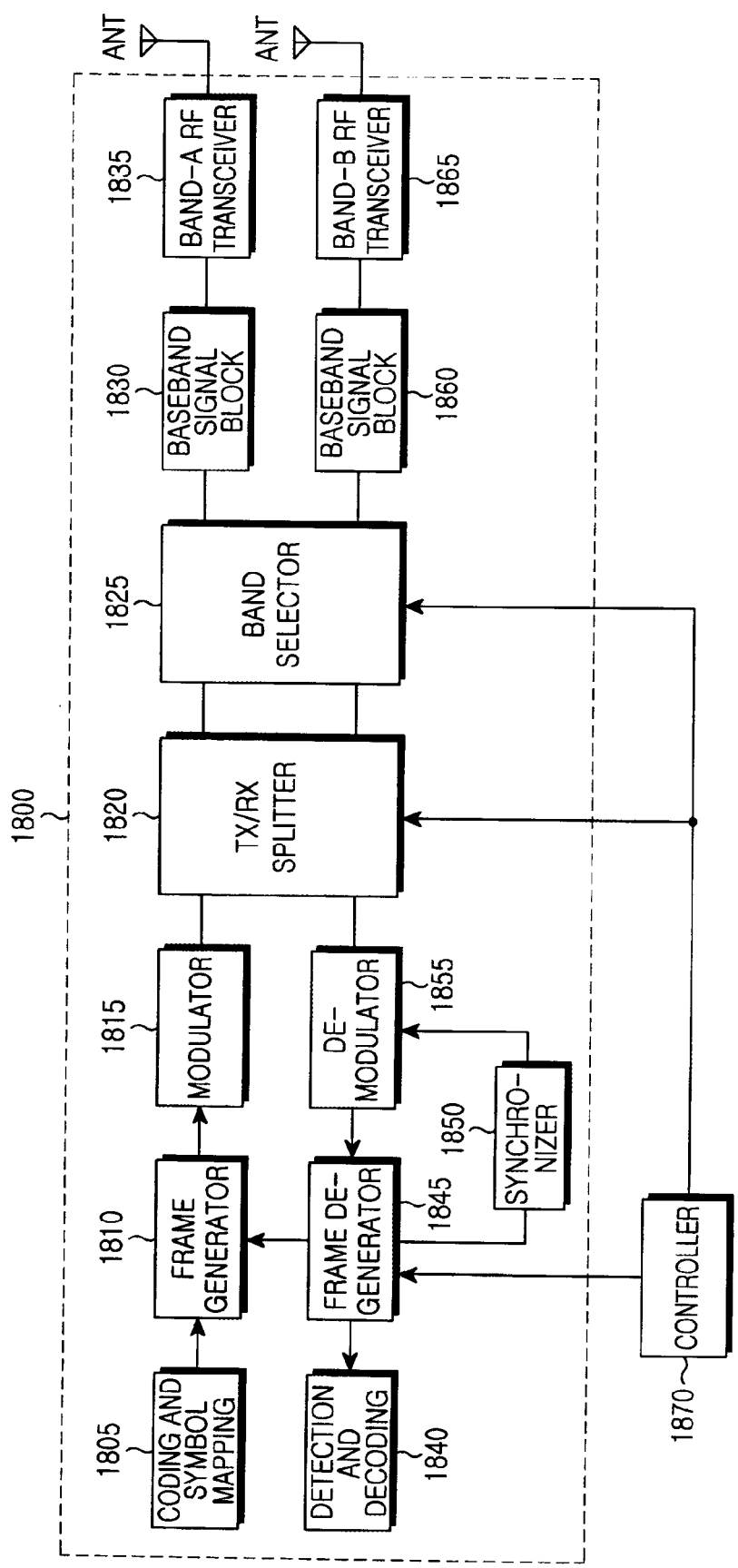
FIG. 18 is a diagram illustrating a structure of an RS according to an exemplary embodiment of the present invention.

FIG. 18 is a diagram illustrating a structure of an RS according to an exemplary embodiment of the present invention.

Referring to FIG. 18, an RS 1800 includes a coding and symbol mapping unit 1805, a frame generator 1810, a modulator 1815, a Tx/Rx splitter 1820, a band selector 1825, a baseband signal block 1830, a frequency band-A RF transceiver 1835, a detection and decoding unit 1840, a frame de-generator 1845, a synchronizer 1850, a demodulator 1855, a baseband signal block 1860, a frequency band-B RF transceiver 1865, and a controller 1870.

The coding and symbol mapping unit 1805 outputs desired transmission data and a control signal to the frame generator 1810. Based on frame configuration information received from the controller 1870, the frame generator 1810 generates a frame configured in the form of FIG. 15 using the received data and control signal, and outputs the generated frame to the modulator 1815. The modulator 1815 modulates the frame, generates a transmission symbol using a pulse shaping filter, and then outputs the result to the Tx/Rx splitter 1820.

The Tx/Rx splitter 1820 determines a transmission slot and a reception slot of each band for data exchange with an MS or a BS according to the transmission/reception time information received from the controller 1870, and outputs the result to the band selector 1825. The band selector 1825 determines a transmission slot and a reception slot for each of transmission and reception bands for data exchange with the MS or the BS according to the path information received from the controller 1870. The first through third duplex methods are determined depending on the band and time slots determined by means of the Tx/Rx splitter 1820 and the band selector 1825.

The data output from the band selector 1825 according to the determined frequency band is delivered to the corresponding MS or BS by way of the frequency band-A RF transceiver 1835 or the frequency band-B RF transceiver 1865 after undergoing the baseband signal block 1830 or 1860.

The symbol received via the BS or the MS is delivered from the band selector 1825 to the Tx/Rx splitter 1820 by way of the frequency band-A RF transceiver 1835 or the frequency band-B RF transceiver 1865 and the baseband signal block 1830 or 1860 according to the corresponding frequency band. Thereafter, the received symbol is demodulated by means of the demodulator 1855, and then separated into a control signal and data by means of the frame de-generator 1845. The frame de-generator 1845 delivers a pilot and a preamble in the received signal to the synchronizer 1850. The synchronizer 1850 performs synchronization with the BS or MS according to the received pilot and preamble.

The data signal and control signal output by means of the frame de-generator 1845 are decoded in the detection and decoding unit 1840. The controller 1870 controls the frame generator 1810 and the frame de-generator 1845 using channel state information received from the BS or the MS, location information necessary for communication with the BS or MS, and its own location information, and delivers transmission/reception time information and path information for determining a duplex method to the Tx/Rx splitter 1820 and the band selector 1825.

Figure 19:
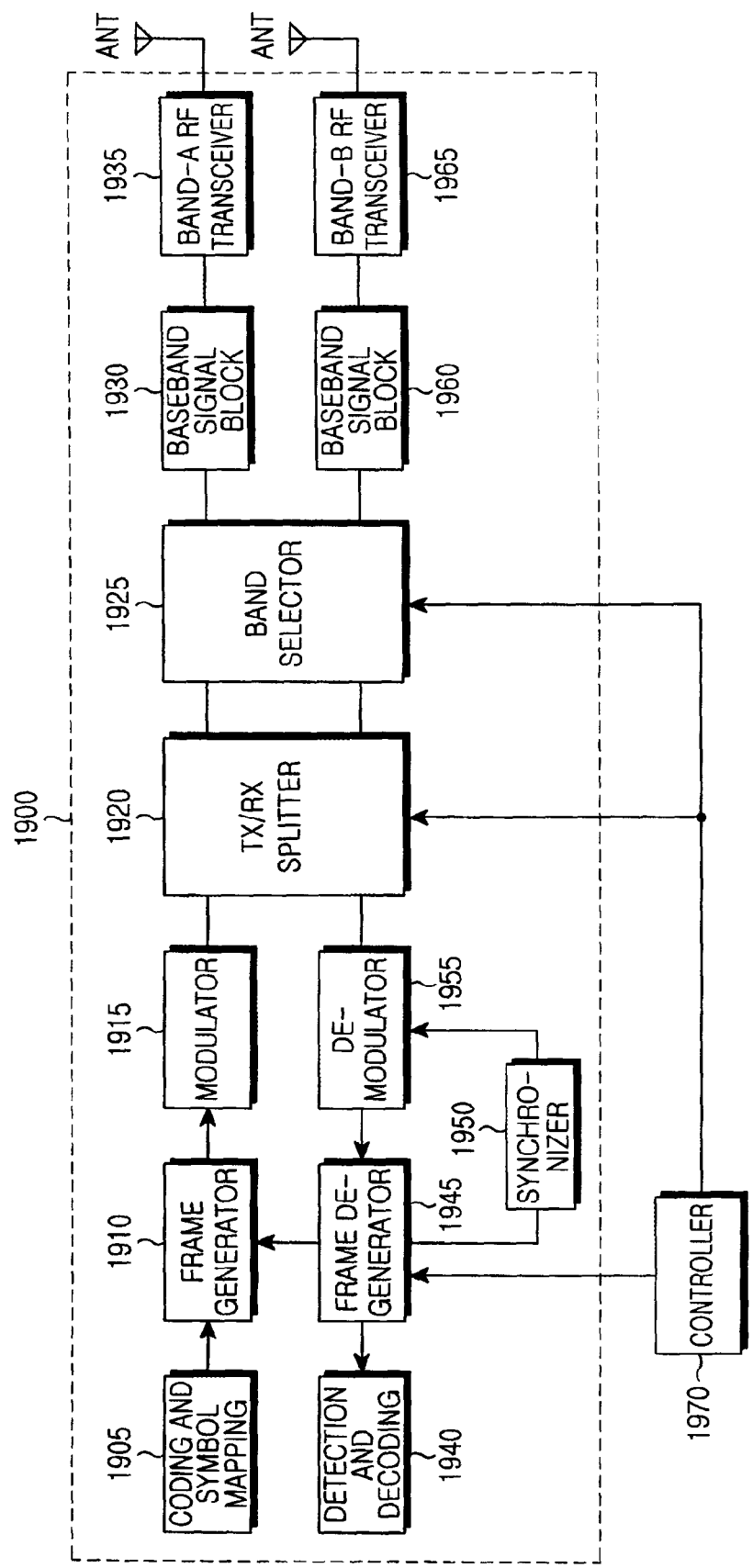
FIG. 19 is a diagram illustrating a structure of a BS according to an exemplary embodiment of the present invention.

FIG. 19 is a diagram illustrating a structure of a BS according to an exemplary embodiment of the present invention.

Referring to FIG. 19, a BS 1900 includes a coding and symbol mapping unit 1905, a frame generator 1910, a modulator 1915, a Tx/Rx splitter 1920, a band selector 1925, a baseband signal block 1930, a frequency band-A RF transceiver 1935, a detection and decoding unit 1940, a frame de-generator 1945, a synchronizer 1950, a demodulator 1955, a baseband signal block 1960, a frequency band-B RF transceiver 1965, and a controller 1970.

The coding and symbol mapping unit 1905 outputs the desired transmission data and a control signal to the frame generator 1910. Based on frame configuration information received from the controller 1970, the frame generator 1910 generates a frame configured in the form of FIG. 15 using the received data and control signal, and outputs the result to the modulator 1915. The modulator 1915 modulates the frame, generates a transmission symbol using a pulse shaping filter, and then outputs the result to the Tx/Rx splitter 1920.

The Tx/Rx splitter 1920 determines a transmission slot and a reception slot of each band for data exchange with an MS or RS according to the transmission/reception time information received from the controller 1970, and outputs the result to the band selector 1925. The band selector 1925 determines a transmission slot and a reception slot for each of transmission and reception bands for data exchange with the MS or RS according to the path information received from the controller 1970. The first through third duplex methods are determined depending on the band and time slots determined by means of the Tx/Rx splitter 1920 and the band selector 1925.

The data output from the band selector 1925 according to the determined frequency band is delivered to the corresponding MS or RS by way of the frequency band-A RF transceiver 1935 or the frequency band-B RF transceiver 1965 after undergoing the baseband signal block 1930 or 1960.

The symbol received via the RS or MS is delivered from the band selector 1925 to the Tx/Rx splitter 1920 via the frequency band-A RF transceiver 1935 or the frequency band-B RF transceiver 1965 and the baseband signal block 1930 or 1960 according to the corresponding frequency band. Thereafter, the received symbol is demodulated by means of the demodulator 1955, and then separated into a control signal and data by means of the frame de-generator 1945. The frame de-generator 1945 delivers a pilot and a preamble in the received symbol to the synchronizer 1950. The synchronizer 1950 performs synchronization with the RS or MS according to the received pilot and preamble.

The data signal and control signal output by means of the frame de-generator 1945 are decoded in the detection and decoding unit 1940.

The controller 1970 controls the frame generator 1910 and the frame de-generator 1945 using channel state information received from the RS or MS, location information necessary for communication with the RS and MS, and its own location information, and delivers transmission/reception time information and path information for determining a duplex method to the Tx/Rx splitter 1920 and the band selector 1925.

As is apparent from the foregoing description, exemplary embodiments of the present invention use different frequency reuse factors in the cell's inner region and the cell's outer region, and provide an adaptive HDD method between the BS and the RS according to the location of the MS, thereby facilitating the minimization of ICI interference.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method for transmitting and receiving data by a Base Station (BS) in a communication system, the method comprising:
   determining a location of a Mobile Station (MS);
   determining a transmission/reception scheme for data transmission and reception to/from the MS according to the location of the MS; and
   transmitting and receiving data to/from the MS using the determined transmission/reception scheme;
   wherein the MS is located in at least one of a cell's inner region and a cell's outer region, and further wherein the cell's inner region has a radius that is adjusted according to an interference level between adjacent cells and the cell's outer region is defined by excepting the cell's inner region from the entire cell region,
   wherein the determining of the transmission/reception scheme comprises:
   when the MS is located in the cell's outer region, determining whether the MS transmits and receives a signal using a Relay Station (RS) located in the cell's inner region; and
   determining the transmission/reception scheme as a time division duplex scheme when the MS transmits and receives a signal using the RS,
   wherein a frequency applied to the time division duplex scheme between the MS and the RS is a second frequency, and a frequency applied to the time division duplex scheme between the BS and the RS is a first frequency which is different from the second frequency.

2. The method of claim 1, wherein a frequency reuse factor used in the cell's inner region is 1 and a frequency reuse factor used in the cell's outer region is less than 1.

3. The method of claim 1, wherein the determining of the transmission/reception scheme comprises:
   when the MS is located in the cell's inner region, determining the transmission/reception scheme as the time division duplex scheme, and determining a frequency applied to the time division duplex scheme as the first frequency;
   wherein the MS located in the cell's inner region uses physically consecutive subcarriers.

4. The method of claim 1, further comprising:
when the MS does not transmit and receive a signal using the RS, determining the transmission/reception scheme as a frequency division duplex scheme; and
determining a frequency applied to the frequency division duplex scheme as the first frequency and the second frequency;
wherein the first frequency is used for data transmission to the MS, and the second frequency is used for data reception from the MS.

5. The method of claim 4, wherein the MS, which does not transmit and receive a signal using the RS, uses physically inconsecutive subcarriers.

6. The method of claim 4, wherein a frequency reuse factor of the MS which does not transmit and receive a signal using the RS comprises a value obtained by adaptively controlling a frequency reuse factor of the cell's outer region taking into account a ratio of interference between adjacent cells to signal strength of a frequency band currently unused in the cell.

7. The method of claim 1, wherein the transmitting and receiving of data to/from the MS using the determined transmission/reception scheme further comprises:
allocating downlink resources and uplink resources for data transmission and reception to/from the MS by at least one of symmetrically and asymmetrically according to a required amount of resources of the system.

8. An apparatus for transmitting and receiving data in a Base Station (BS) of a communication system, the apparatus comprising:
a controller for determining a location of a Mobile Station (MS), and for determining a transmission/reception scheme for data transmission and reception to/from the MS according to the location of the MS; and
a transceiver for transmitting and receiving data to/from the MS using the determined transmission/reception scheme;
wherein the MS is located in at least one of a cell's inner region and a cell's outer region, and further wherein the cell's inner region has a radius that is adjusted according to an interference level between adjacent cells, and the cell's outer region is defined by excepting the cell's inner region from the entire cell region,
wherein, when the MS is located in the cell's outer region, the controller determines whether the MS transmits and receives a signal using a Relay Station (RS) located in the cell's inner region, and determines the transmission/reception scheme as a time division duplex scheme when the MS transmits and receives a signal using the RS, and
wherein a frequency applied to the time division duplex scheme between the MS and the RS is a second frequency, and a frequency applied to the time division duplex scheme between the BS and the RS is a first frequency which is different from the second frequency.

9. The apparatus of claim 8, wherein a frequency reuse factor used in the cell's inner region is 1 and a frequency reuse factor used in the cell's outer region is less than 1.

10. The apparatus of claim 8, wherein, when the MS is located in the cell's inner region, the controller determines the transmission/reception scheme as the time division duplex scheme and determines a frequency applied to the time division duplex scheme as the first frequency;
wherein the MS located in the cell's inner region uses physically consecutive subcarriers.

11. The apparatus of claim 8, wherein, when the MS does not transmit and receive a signal using the RS, the controller determines the transmission/reception scheme as a frequency division duplex scheme, and determines a frequency applied to the frequency division duplex scheme as the first frequency and the second frequency;
wherein the first frequency is used for data transmission to the MS, and the second frequency is used for data reception from the MS.

12. The apparatus of claim 11, wherein the MS, which does not transmit and receive a signal using the RS, uses physically inconsecutive subcarriers.

13. The apparatus of claim 11, wherein a frequency reuse factor of the MS which does not transmit and receive a signal using the RS comprises a value obtained by adaptively controlling a frequency reuse factor of the cell's outer region taking into account a ratio of interference between adjacent cells to signal strength of a frequency band currently unused in the cell.

14. The apparatus of claim 8, wherein the controller allocates downlink resources and uplink resources for data transmission and reception to/from the MS by at least one of symmetrically and asymmetrically according to a required amount of resources of the system.

* * * * *